United States Patent [19]
Grecksch et al.

[11] Patent Number: 5,190,136
[45] Date of Patent: Mar. 2, 1993

[54] MAGNETIC GUIDING ASSEMBLY FOR YARN PACKAGES TRANSPORTED ON A TEXTILE MACHINE

[75] Inventors: Hans Grecksch; Rolf Mayer, both of Moenchen-Gladbach; Michael Lys, Neuss; Helmut Kohlen, Erkelenz; Gerhard Radziejewski, Moenchen-Gladbach, all of Fed. Rep. of Germany

[73] Assignee: W. Schlafhorst & Co., Moenchan-Gladbach, Fed. Rep. of Germany

[21] Appl. No.: 535,884

[22] Filed: Jun. 11, 1990

[30] Foreign Application Priority Data

Oct. 6, 1989 [DE] Fed. Rep. of Germany ....... 3919106
Dec. 4, 1989 [DE] Fed. Rep. of Germany ....... 4011797

[51] Int. Cl.$^5$ .............................. B65G 47/46
[52] U.S. Cl. .................... 198/372; 198/439; 198/465.1; 198/619; 209/636; 209/927; 242/35.5 A
[58] Field of Search ............ 198/372, 370, 439, 690.1, 198/465.1, 803.01, 803.12, 619; 242/35.5 A; 209/636, 927

[56] References Cited

U.S. PATENT DOCUMENTS

| | | | |
|---|---|---|---|
| 2,264,348 | 12/1941 | Weygant | 198/439 |
| 3,092,237 | 6/1963 | Miller | 198/690.1 X |
| 3,167,168 | 1/1965 | Park | 198/439 |
| 3,621,979 | 11/1971 | Kraeft | 198/690.1 |
| 3,941,237 | 3/1976 | MacGreor | 198/690.1 |
| 4,545,551 | 10/1985 | Uchida et al. | 242/35.5 A |
| 4,605,177 | 8/1986 | Uchida et al. | 242/35.5 A |
| 4,681,231 | 7/1987 | Ueda et al. | |

FOREIGN PATENT DOCUMENTS 2223030 11/1972 Fed. Rep. of Germany.
2135330 1/1973 Fed. Rep. of Germany.

*Primary Examiner*—Joseph E. Valenza
*Attorney, Agent, or Firm*—Shefte, Pinckney & Sawyer

[57] ABSTRACT

A tube transport assembly is provided for individually transporting tubes of the type onto which yarn is wound on a textile machine. The tube transport assembly includes magnetic components for guiding and transporting the tube support members along a transport path by magnetic interaction with ferromagnetic portions of the tube support members. The magnetic components can be configured as electromagnets or as permanent magnets. The transport path includes a junction at which the tube support members can be individually branched onto a branch path and a magnetic component is positioned adjacent the junction for selectively magnetically engaging the tube support members to guide the tube support members along to selected branch paths. A vertical transport component includes magnetically active carrier members mounted on an endless belt and is operable to magnetically engage and carry the tube support members vertically.

23 Claims, 11 Drawing Sheets

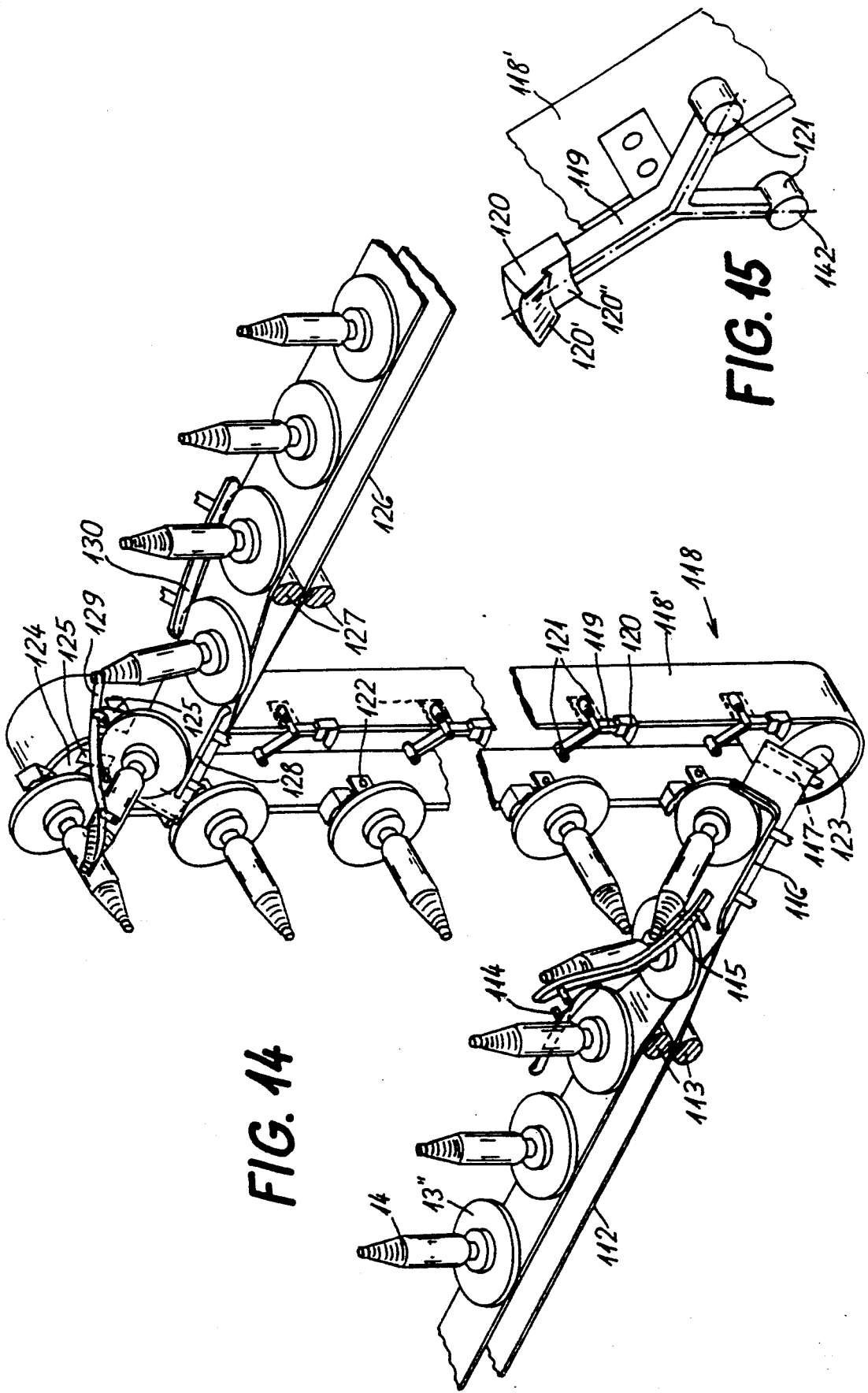

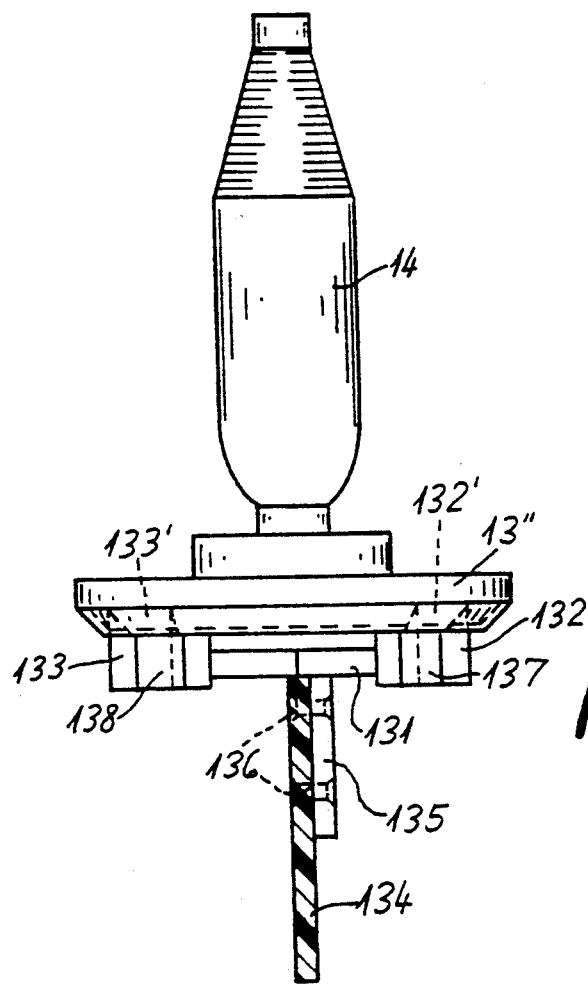
FIG.16
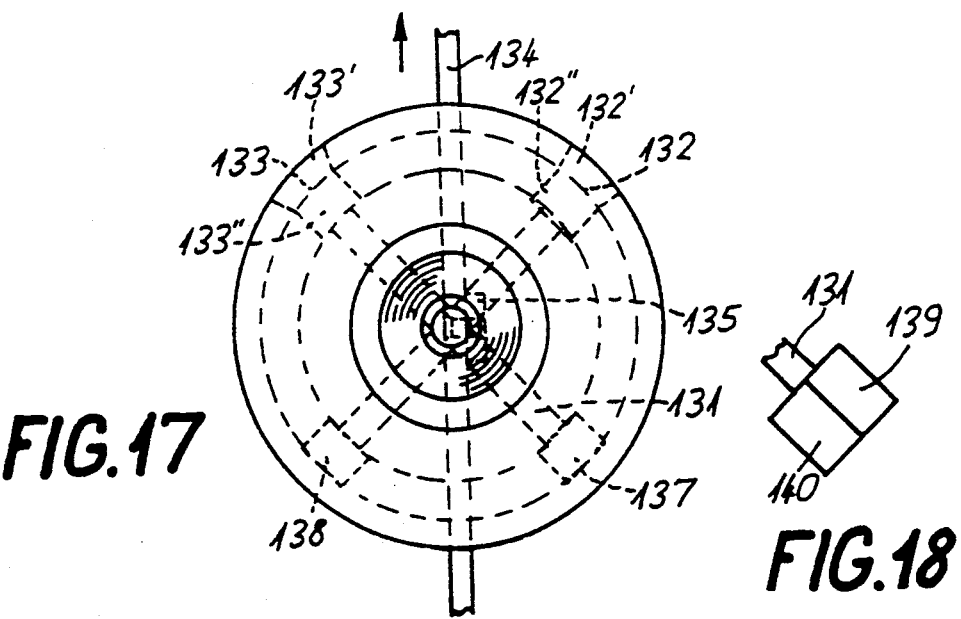
FIG.17
FIG.18

MAGNETIC GUIDING ASSEMBLY FOR YARN PACKAGES TRANSPORTED ON A TEXTILE MACHINE

BACKGROUND OF THE INVENTION

The present invention relates to an assembly for transporting tubes of the type on which yarn is wound on a textile machine.

It is known to provide a system for transporting tubes between a spinning machine and a winding machine in which the tubes are individually supported in upright dispositions on peg tray-type tube support members during their transport. Such peg tray-type tube support members are typically driven along fixed, slotted guide members in the linear and arcuate transport directions. One common type of drive for transporting the tube support members along the guide members includes a series of interrelated flexible endless belts positioned relative to one another to effect smooth transfer of tube support members from one flexible belt to another. However, the rotating components of the assemblies for driving the belts (such as, for example, the guide rollers around which the belts are trained) as well as other components of the transport system (such as, for example, stop members for preventing further transport of a tube support member and branching members for diverting tube support members from a given transport path) may detrimentally snag or otherwise engage stray yarn ends on the yarn packages transported by the tube support members. This snagging activity detrimentally impacts the production capacity of the transport system.

These known transport systems which comprise endless belts and fixed, slotted guide members also present certain disadvantages in vertically transporting tube support members. For example, one known vertical transport system relies upon pressing the endless belt against the bottom of the tube support members with sufficient force to insure that the tube support members move in correspondence with the movement of the endless belt during upwardly inclined movement of the belt. The tube support members are pressed against the top inner surfaces of the slotted guide member due to the action of the endless belt pressing against the bottom of the tube support members and the frictional sliding of the top surfaces of the tube support members against the top inner surfaces of the guide members leads to undesirable wearing of the tube support members. Additionally, such vertical transport systems typically transport the tube support members at an orientation inclined from the vertical, thereby necessitating more operating room than would be needed if the tube support members were vertically transported. Accordingly, the need exists for a transport system for transporting tube support members of the type which support tubes in upright dispositions thereon by which transport interfering acts such as snagging of stray yarn ends are minimized and by which the space requirements of such a transport system are optimally minimized.

SUMMARY OF THE INVENTION

The present invention provides an assembly for transporting tubes of the type onto which yarn is built to form yarn packages which utilizes magnetic attraction to guide and manipulate tube support members in an effective manner that thereby eliminates the need for mechanical components that are susceptible to causing transport interruptions such as snagging of stray yarn ends and permits optimal space utilization.

Briefly described, the present invention is an assembly for transporting tubes in association with a textile machine where the tubes are of the type on which yarn is wound. The tubes are transported on a plurality of tube support members traveling along a predetermined travel path, with each tube support member individually including a common selected one of a magnetic means and a ferromagnetic component. According to one feature of the present invention, the tube support members are guided by guiding means that include the other of the magnetic means and ferromagnetic component, and means are provided for selectively operating the magnetic means or ferromagnetic component of the guiding means for magnetic interaction with the tube support members to effect guiding thereof. According to another feature of the present invention, a vertical transport component is provided with carrier member conveying means extending between vertically spaced locations for conveying carrier members that have magnetic means operable to magnetically interact with ferromagnetic components of tube support members to support the tube support members for conveyance between the vertically spaced locations.

With regard to the magnetic guiding means, sensing means are included to sense the tube support members on the travel path, with operating means functioning to selectively operate the magnetic means for guiding of the tube support members by magnetic interaction.

The magnetic means can take the form of a plurality of electromagnets spaced along the travel path and functioning in relation to the configuration of the travel path to control the spacing of tube support members along the travel path and to selectively direct tube support members into selected branch paths.

In one form of the invention, electromagnets are disposed in a series along the travel path and are sequentially activated to cause the tube support members to advance in magnetically following the sequential actuation of the electromagnets.

In accordance with the vertical transport feature, a plurality of carrier members are individually secured to a carrier member conveying means at spacings therealong, with the carrier member conveying means extending vertically between spaced locations. Each carrier member has magnetic means operable to magnetically interact with ferromagnetic components of the tube support members to support the tube support members for conveyance between vertically spaced locations. The magnetic means preferably includes a magnetic contact surface compatibly configured with the ferromagnetic component of the tube support members for surface to surface contact during magnetic interaction. In the preferred embodiment the tube support members have the ferromagnetic components formed on an annular surface tapering radially inwardly in the direction of the bottom of the tube support member and the carrier members have compatibly configured surfaces. With this arrangement, the tube support members may be transported on a horizontal transport component and oriented at a lateral inclination for magnetic interengagement with carrier members traveling vertically therepast. Contoured rails support the tube support members at their inclined disposition and a stop rail positions the tube support member in the transfer position. In the preferred embodiment the magnetic means of the carrier members includes an initial tube support member engaging surface arcuately shaped along a radius corresponding to the radius of the annular tapering ferromagnetic surface of the tube support members for initially magnetically interengaging the tube support member along its annular tapering surface for initially raising the tube support member from its inclined position on the lower horizontal transport component. The carrier member magnetic means further includes a plurality of generally planar, supplementary magnetic surfaces for surface to surface contact by the bottom of the tube support member ferromagnetic surface as the carrier members move the tube support members upwardly from inclined disposition on the horizontal transport component.

An upper horizontal transport component is preferably associated with the vertical transport component at the upper vertical location and includes means for inclining and supporting tube support members in disposition for transfer from the vertical component onto the horizontal component. For this purpose means are provided for interrupting the magnetic interaction between the carrier member magnetic means and the ferromagnetic components of the tube support members, which interrupting means includes a pair of tapered members positioned on opposite lateral sides of the carrier member conveying means for movement of tube support members outwardly from the respective supporting carrier members to interrupt the magnetic interaction and thereby effect release of the tube support members from the vertical transport component.

Briefly summarized, the present invention provides, in one aspect, an assembly for transporting tubes in association with a textile machine, the tubes being of the type on which yarn is wound. The assembly includes a plurality of tube support members for supporting tubes for transport along a predetermined travel path, the tube support members individually including a common selected one of a magnetic means and a ferromagnetic component and means for guiding the tube support members during the travel thereof along the predetermined path, the guiding means including the other of the magnetic means and the ferromagnetic component. The assembly also includes means for selectively operating the other one of the magnetic means and the ferromagnetic component for magnetic interaction with the tube support members to effect guiding thereof.

In this one aspect of the present invention, the tube support members include the ferromagnetic component and the guiding means includes the magnetic means. Also, the selectively operating means includes sensing means disposed relative to the predetermined travel path of the tube support members for sensing the travel therepast of the tube support members, the selectively operating means operating the magnetic means for magnetic interaction with the ferromagnetic components of the tube support members in response to sensing by the sensing means.

According to another feature of the assembly of the present invention, the selectively operating means includes sequencing means for operating the magnetic means for magnetic interaction with the ferromagnetic components of the tube support members in accordance with a predetermined sequence to effect advancement of the tube support members along at least a selected portion of the travel path.

In one configuration of the assembly of the present invention, the magnetic means includes an electromagnet configured to be magnetically activated in correspondence with the flow of electricity thereto. In another configuration, the magnetic means includes a permanent magnet.

In the configuration of the assembly including a permanent magnet, the selectively operating means includes means for selectively moving the permanent magnet between a magnetic interaction position in which the permanent magnet is disposed relative to the predetermined travel path for magnetically interacting with the ferromagnetic components of the tube support members to effect guiding of the tube support members and a non-active position in which the permanent magnet is spaced from the predetermined travel path by an amount to substantially preclude guiding of the tube support members due to magnetic interaction between the ferromagnetic components of the tube support members and the permanent magnet.

In the configuration of the assembly including an electromagnet, the magnetic means includes a plurality of electromagnets disposed relative to at least a selected portion of the predetermined travel path for magnetic interaction with the ferromagnetic components of the tube support members to guide the tube support members along the selected portion of the predetermined travel path and means for controlling the magnetic activation of the electromagnets to sequentially magnetically activate the electromagnets in the direction of advancement of the tube support members along the selected portion of the predetermined travel path to effect sequential individual magnetic interaction of the electromagnets with the ferromagnetic components of the tube support members. The electromagnets are preferably disposed on a common lateral side of the predetermined travel path, and the tube support members preferably have annular peripheries adjacent the electromagnets with the ferromagnetic components disposed around the peripheries. The control means cyclically activates the electromagnets to effect translational rotation of the tube support members along the selected portion of the predetermined travel path.

According to additional features of the assembly, the guiding means includes an endless member assembly having an endless member and means for driving the endless member. The endless member frictionally engages the tube support members to advance the tube support members along the predetermined travel path in correspondence with the driving operation of the endless member. The means for selectively operating operates the magnetic means to magnetically interact with the ferromagnetic components of the tube support members to oppose the frictional engagement of the tube support members by the endless member.

According to one aspect of the assembly of the present invention, the predetermined travel path includes at least one junction from which the predetermined travel path extends in at least two different directions and the selectively operating means is selectively operable to operate the magnetic means for guiding of the tube support members along a selected one of the directions of the predetermined travel path extending from the junction.

According to a different aspect of the assembly of the present invention, the magnetic means includes a pair of magnets, each magnet being selectively operable to magnetically interact with the ferromagnetic components of the tube support members at a location along the predetermined travel path spaced from the location along the predetermined travel path at which the other magnet magnetically interacts with the tube support members. Additionally, the tube support members have annular peripheries adjacent the electromagnets with the ferromagnetic components disposed around the peripheries. The magnets are spaced from one another relative to the predetermined travel path by at least the diameter of the annular periphery of a tube support member.

The assembly further includes, in this one aspect, the features of the tube support members having annular peripheries adjacent the electromagnets with the ferromagnetic components disposed around the peripheries, and the magnetic means including a first magnet selectively operable to magnetically interact with the ferromagnetic components of the tube support members. Also, the guiding means includes a cooperating member spaced from the first magnet at a spacing less than the diameter of the annular periphery of a tube support member, the first magnet and the cooperating member cooperating to engage a tube support member at circumferentially spaced locations thereon to respectively retain the engaged tube support member at a predetermined location along the predetermined travel path. The first magnet is annularly shaped. Additionally, the cooperating member is a second magnet, the second magnet being annularly shaped.

In one of the forms of the assembly, the predetermined travel path includes a junction from which the predetermined travel path branches in at least two different directions and the second magnet is selectively magnetically activatable at a position adjacent the junction for guiding of tube support members through the junction onto a selected branch of the predetermined travel path through translational rotation of the tube support members about the circumference of the second magnet. Also, the guiding means includes means for sensing the presence of a tube support member at a predetermined sensing location relative to the predetermined retaining location. The sensing means is operatively connected to the selectively operating means and operating the second magnet for magnetic interaction with the ferromagnetic component of a sensed tube support member in response to sensing by the sensing means of the respective tube support member.

The one form of the assembly also includes the features that the selectively operating means selectively operates the first and second magnets out of magnetic interaction with the ferromagnetic component of a tube support member engaged by the magnets to permit guiding of the tube support member by the guiding means along a predetermined one of the predetermined travel path branches.

The one form of the assembly can alternatively include the feature that the selectively operating means operates the first magnet out of magnetic interaction with the ferromagnetic component of a tube support member engaged by the first and second magnets and simultaneously operates the second magnet for magnetic interaction with the ferromagnetic component of the tube support member to effect guiding of the tube support member through the junction to a selected one of the predetermined travel path branches. A further feature is that the selectively operating means operates the first magnet for magnetic interaction with the ferromagnetic component of a tube support member which follows the tube support member in correspondence with the guiding of the tube support member by the second magnet to the selected one of the predetermined travel path branches to control the travel of tube support members along the travel path.

According to a different aspect of the form of the assembly, the guiding means includes a sensor, operatively connected to the selectively operating means, for sensing a selected characteristic of a selected one of a tube support member retained at the predetermined retaining location, a tube supported on the retaining tube support member and a yarn package built on the tube, the selectively operating means selectively operating the first and second magnets in response to sensing by the sensor of the selected characteristic to selectively guide the retained tube support member to a selected one of the predetermined travel path branches in accordance with the sensed characteristic.

According to yet a further additional aspect of the present invention, the guiding means includes an endless member assembly having an endless member and means for driving the endless member, and means for controlling the lateral orientation of the tube support members on the endless member transversely to the endless extent of the endless member. The lateral orientation controlling means is operable to laterally displace the tube support members partially laterally beyond a respective lateral side of the endless member at the predetermined retaining location and cooperates with the first and second magnets to laterally displace a tube support member partially laterally beyond the one respective lateral side of the endless member in position for magnetic interaction of the ferromagnetic component of the laterally displaced tube support member by the first and second magnets. Also, the endless member acts to advance a tube support member from the predetermined retaining location in coordination with the operation of the first and second magnets to effect advancement of tube support members through the junction to a selected one of the predetermined travel path branches.

According to yet an additional aspect of the present invention, the lateral orientation controlling means includes a component positioned downstream of the location at which the second magnet magnetically interacts with the ferromagnetic components of the tube support members relative to the direction of advancement of the tube support members along the predetermined travel path for guiding tube support members laterally inwardly relative to the endless member.

According to another variation of the present invention, there is provided an assembly for transporting tubes in association with a textile machine, the tubes being of the type on which yarn is wound. The assembly preferably includes a plurality of tube support members for supporting tubes for transport along a predetermined travel path, the tube support members including ferromagnetic components and a vertical transport component including carrier member conveying means extending between vertically spaced locations. Also, the assembly preferably includes a plurality of carrier members individually secured to the carrier member conveying means at spacings therealong, each carrier member having magnetic means operable to magnetically interact with the ferromagnetic components of the tube support members to support the tube support members for conveyance thereof between the vertically spaced locations.

According to one aspect of this variation of the present invention, each carrier member magnetic means includes an initial tube support member contact surface compatibly configured with the ferromagnetic component of the tube support members for surface to surface contact therewith during magnetic interaction between each carrier member magnetic means and the ferromagnetic component of a tube support member, and the vertical transport component includes means for maintaining the initial contact surfaces of the carrier member magnetic means in generally vertical orientations during conveyance of the tube support members by the vertical transport component.

According to another aspect of this other variation of the present invention, the ferromagnetic component of each tube support member forms an annular surface on the respective tube support member tapering radially inwardly relative to the tube support member in the direction toward the bottom of the tube support member and a lower horizontal transport component having a flexible endless member for traveling support of tube support members thereon. The flexible endless member of said lower horizontal transport component extends to a transfer location adjacent the lower one of the vertically spaced locations for the transfer of tube support members to the carrier members on the lower flexible endless member. Also, the assembly includes means for inclining the lateral orientation of the lower flexible endless member at the transfer location for transfer of the tube support members in the inclined orientations for corresponding inclined orientations of the tube support members between the carrier members and the lower flexible endless member.

The other variation of the present invention also includes, in one aspect, lower transfer support means positioned at the downstream transfer location for supporting tube support members in cooperation with the lower flexible endless member during transfer of tube support members to the carrier members. The lower flexible endless member and the lower transfer support means cooperate to support a tube support member to be transferred at a predetermined inclination such that the annular tapering ferromagnetic surface of the tube support member is oriented for surface to surface magnetic interaction with the initial contact surface of the magnetic means of a carrier member.

According to further aspects of the other variations of the present invention, the lower transfer support means includes a contoured rail disposed at the downstream transfer location having a contour for continuously supporting an exposed upper end of a tube supported on a tube support member during inclining of the tube in correspondence with the movement of the respective tube support member from a horizontal orientation to an inclined transfer orientation at the downstream transfer location. Also, the lower transfer support means includes a stop rail located at the downstream transfer location for positioning a tube support member in position for transfer at a predetermined lateral orientation relative to the lower flexible endless member.

According to an additional further aspect of the other variation of the present invention, the ferromagnetic component of each tube support member includes an annular bottom surface at the circumference of the bottom of the respective tube support member and the magnetic means of each carrier member includes an initial tube support member contact surface and a plurality of generally planar, supplementary magnetic surfaces. Also, each carrier member includes bracket means for supporting the plurality of supplementary magnetic surfaces in respective spaced dispositions from one another for surface to surface magnetic interengagement of each supplementary magnetic surface with the annular ferromagnetic bottom surface of a tube support member at circumferentially spaced locations thereon. According to one feature of this further aspect of the present invention, the initial tube support member contact surface of each magnetic means is arcuately shaped along a radius corresponding to the radius of the annular tapering ferromagnetic surface of a tube support member for initially magnetically interengaging the tube support member along its annular tapering ferromagnetic surface for initially raising the tube support member from the lower horizontal transport component into surface to surface contact of the supplementary magnetic surfaces with the annular ferromagnetic bottom surface of the respective tube support member.

In yet a further aspect of the other variation of the present invention, there is provided an upper horizontal transport component having a flexible endless member for transporting tube support members thereon, the upper flexible endless member extending from adjacent the upper vertical location for the transfer of tube support members from the carrier members of the vertical transport component to the upper flexible endless member for transporting of tube support members from the upper vertical location. Also, there is provided means for inclining the lateral orientation of the upper flexible endless member at the transfer location for receiving tube support members transferred from the carrier members to the upper flexible endless member.

The upper horizontal transport component preferably includes upper transfer support means positioned at the upper vertical location for inclining and supporting tube support members in disposition for transfer to the upper flexible endless member. Also, the upper transfer support means preferably includes a contoured rail having a contour for continuously supporting an exposed upper end of a tube supported on a tube support member being transferred onto the upper flexible endless member during movement of the respective tube support member from a horizontal orientation to an inclined transfer orientation at the upstream transfer location.

According to yet another aspect of the other variation of the present invention, there is provided means for interrupting the magnetic interaction between the carrier member magnetic means and the ferromagnetic components of the tube support members supported on the carrier members at the transfer location to effect release of the tube support members from the carrier members onto the upper flexible endless member. The interrupting means preferably includes a pair of tapered members positioned on opposite lateral sides of the carrier member conveying means and tapering outwardly therefrom, the tapered members being laterally spaced from one another by an amount sufficient to permit passage therebetween of carrier members and less than the extent of a tube support member for movement of each tube support member outwardly from the respective supporting carrier member to interrupt the magnetic interaction and thereby effect release of the tube support member from the vertical transport component.

According to an additional aspect of the present invention, the initial contact surface has an area at least twice as large as the area of each of the supplementary magnetic surfaces. Also, the initial contact surface and the supplementary magnetic surfaces have opposite magnetic polarity.

Other and further features of the present invention will become apparent from the accompanying drawings and the following detailed description.

BRIEF DESCRIPTION OF THE DRAWINGS

FIG. 14 is a perspective view of another type of the vertical transport component suitable for use in the embodiment of the tube transport assembly shown in FIG. 1;

FIG. 15 is an enlarged perspective view of a carrier member and a portion of the carrier member conveying means of the vertical transport component shown in FIG. 14;

FIG. 16 is a front elevational view, in partial vertical section, of an additional modification of the embodiment of the tube transport assembly shown in FIG. 1;

FIG. 17 is a plan view of the additional modification of the embodiment of the tube transport assembly shown in FIG. 16; and FIG. 18 is an enlarged plan view of a portion of the tube transport assembly shown in FIG. 17.

DETAILED DESCRIPTION OF THE PREFERRED EMBODIMENTS

Figure 1:
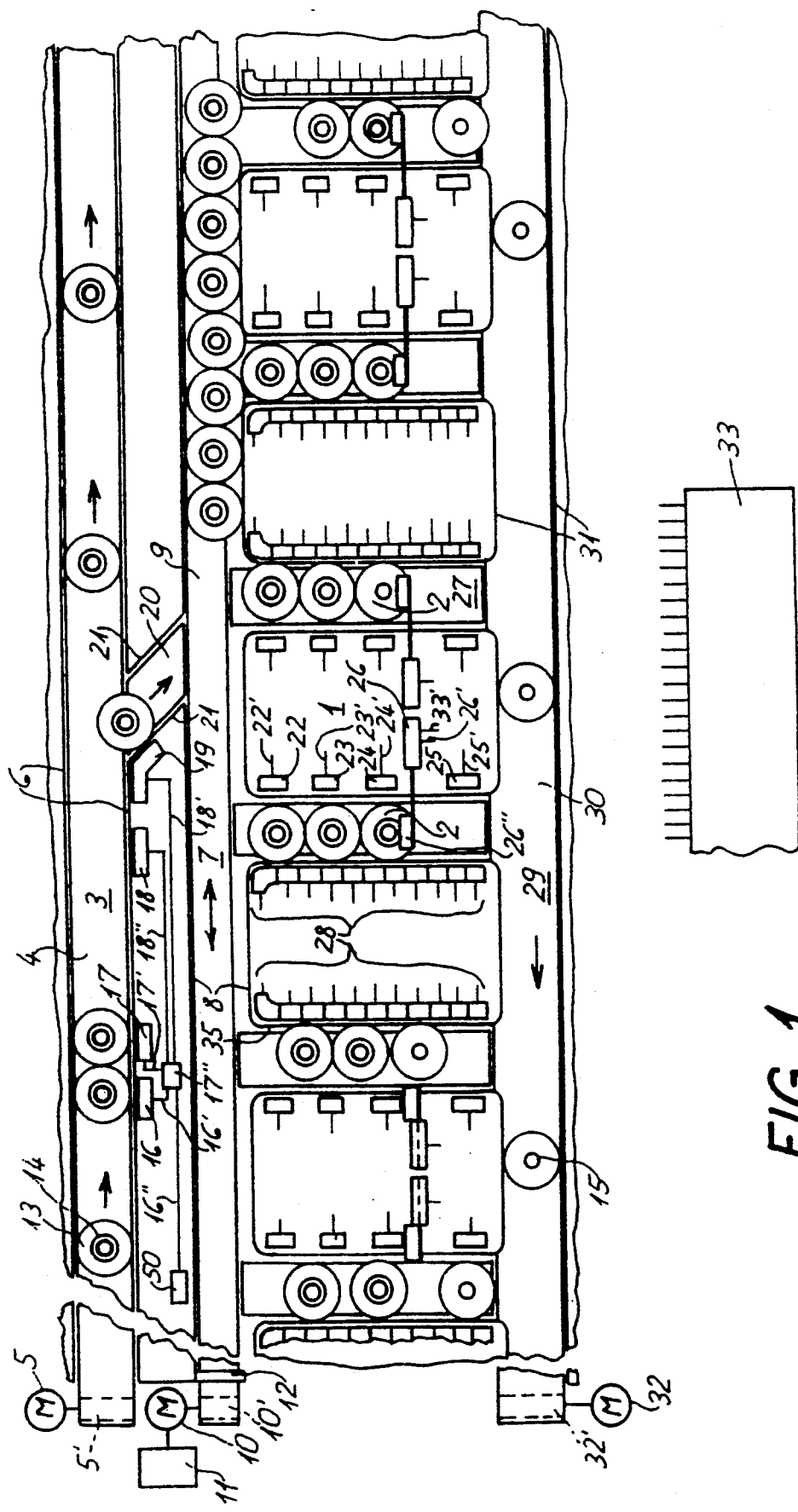
FIG. 1 is a plan view of a portion of a textile winding machine having one embodiment of the tube transport assembly of the present invention incorporated therein.

In FIGS. 1–18, one embodiment of the tube transport assembly of the present invention is illustrated. As seen in FIG. 1, the tube transport assembly is adapted to transport tubes of the type on which yarn is wound through, for example, a textile winding machine 1. The tube transport assembly includes a plurality of tube support members 13 having annular bases and upstanding pegs for individually supporting a plurality of tubes 15 in upright dispositions during travel between a yarn package receiving location at which a plurality of yarn packages 14 individually built on the tubes 15 are supplied to the textile winding machine 1, the winding stations of the textile machine and an empty tube transfer location at which the tubes 15, having no yarn thereon, are transferred from the textile winding machine 1. The tube transport assembly includes a guide means defining a yarn package delivery route 3 along which the tube support members 13, with the yarn packages 14 supported thereon, are transported from the yarn package receiving location to the winding stations of the textile winding machine 1.

The initial portion of the yarn package delivery route 3 extending from the yarn package receiving location is formed by a conventional flexible endless member in the form of a main supply belt 4 trained around a conventional guide roller (not shown) and a conventional drive roller 5', which is operatively connected to a conventional drive motor 5 for driving operation of the main supply belt 4. The main supply belt 4 extends along a slot formed by a pair of opposed conventional guide plates 6 which include opposed curved edge portions spaced from one another at a spacing relatively slightly greater than the diameter of a tube support member 13 for maintaining the tube support members 13 in a relatively stable lateral orientation on the main supply belt 4 relative to the endless extent of the belt.

The yarn package delivery route 3 is additionally formed by a conventional flexible endless member in the form of a final supply belt 7 extending parallel to the main supply belt 4 and intermediate the main supply belt 4 and the winding stations of the textile winding machine 1. The final supply belt 7 is trained around a conventional guide roller (not shown) and a conventional drive roller 10', which is operatively connected to a conventional drive motor 10 for driving operation of the final supply belt 7. The drive motor 10 is operatively connected to a control unit 11 for control of the operation of the drive motor.

A pair of conventional stop members 12 (only one of which is shown) are disposed at respective locations transversely across the travel path of the final supply belt 7 beyond the endmost winding stations for confining the tube support members 13 to travel within the travel path of the final supply belt 7 extending between the two stop members. The control unit 11 controls the drive motor 10 to cyclically reversibly drive the final supply belt 7 in opposite travel directions.

A plurality of sliding support members 27 each extend through a respective one of the winding stations 2 for sliding support of the tube support members 13 between the final supply belt 7 and a conventional flexible endless member in the form of a discharge belt 29 for transporting the tube support members 13 from the sliding support members 27 to a location for further handling such as, for example, an empty tube transfer location. The sliding support members 27 have lateral guide rails are preferably formed of a magnetically neutral material such as, for example, plastic which additionally offers only relatively low frictional resistance to the movement of the tube support members 13 therealong. The lateral extent of the final supply belt 7 perpendicular to its endless extent is less than the diameter of a tube support member 13 so that the upstream ends of the winding station support members can readily receive the tube support members 13 for movement through the winding stations.

A support member 20 forms a branch of the delivery route 3 and includes a sliding surface extending from the main supply belt 4 to the final supply belt 7 for sliding support of the tube support members 13 traveling from the main supply belt 4 to the final supply belt 7. The support member 20 is disposed in a slot defined by two opposed linear guide plates 21 which are spaced from one another at a spacing slightly greater than the diameter of a tube support member 13. To facilitate sliding movement of the tube support member 13 along the support member 20, the main supply belt 4 is disposed at a higher horizontal plane than the final supply belt 7 and the support member 20 extends at an incline from the main supply belt 4 toward the final supply belt 7.

To beneficially guide the tube support members 13 on the several belts and other components which form the yarn delivery route 3 and to control the feed of the yarn packages 14 supported on the tube support members 13 through the several winding stations for winding of the yarn packages thereat, each of the tube support members 13 includes a ferromagnetic component and the guide means of the tube transport assembly includes magnetic means for magnetically attracting and guiding the tube support members during their travel. The guide means of the tube transport assembly also includes means for selectively operationally disposing the magnetic means for magnetic interaction with the ferromagnetic components of the tube support members to effect guiding of the tube support members.

Figure 7:
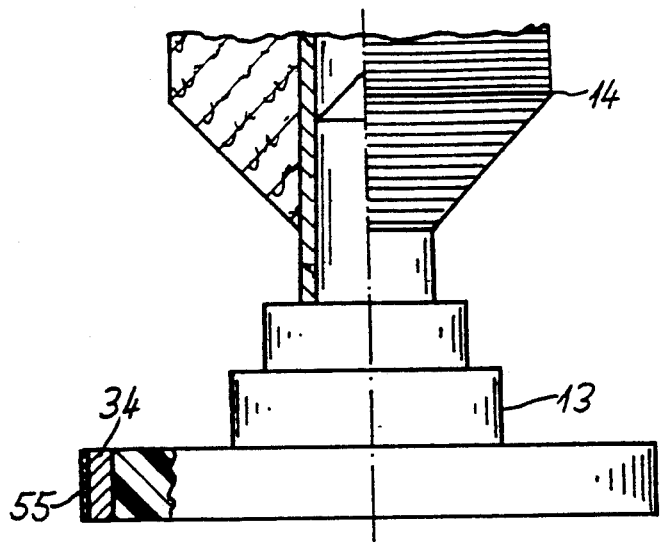
FIG. 7 is a front elevational view, in partial vertical section, of one type of tube support member, with a tube supported thereon, suitable for use in the embodiment of the tube transport assembly shown in FIG. 1.
Figure 8:
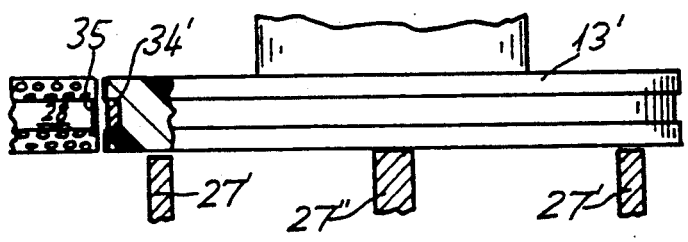
FIG. 8 is a front elevational view, in partial vertical section, of another type of tube support member suitable for use in the embodiment of the tube transport assembly shown in FIG. 1 and illustrated in vertical section, a magnetic component of the tube transport assembly.
Figure 9:
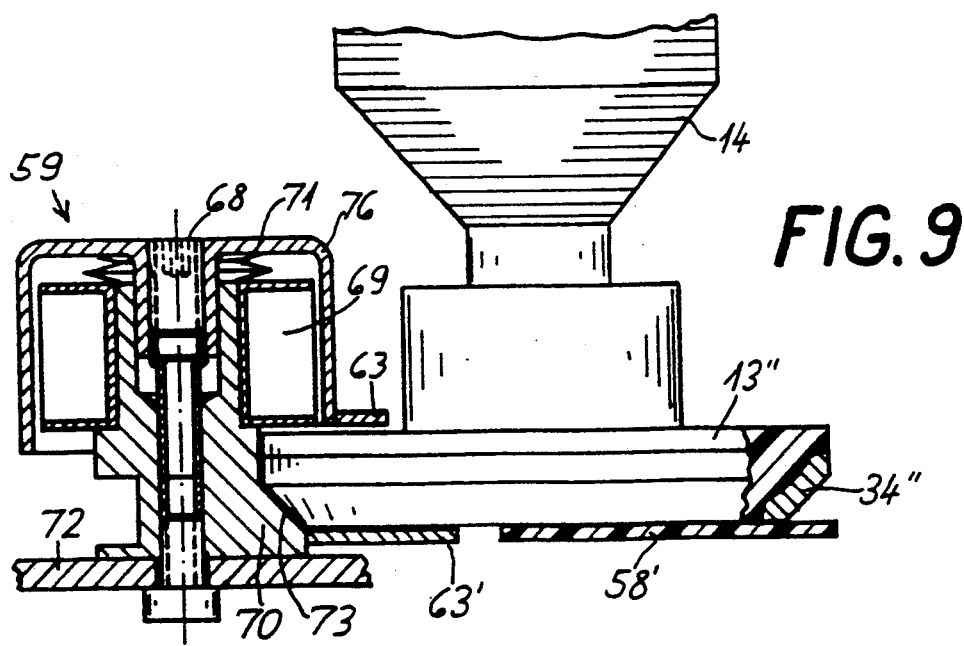
FIG. 9 is a front elevational view, in partial vertical section, of an electromagnetic member and a further type of tube support member suitable for use in the embodiment of the tube transport assembly shown in FIG. 1.

FIGS. 7–9 each illustrate a different type of the tube support members 13 suitable for use in the tube transport assembly of the present invention. As seen in FIG. 7, each tube support member 13 includes an annular base portion, an annular collar portion of lesser diameter than the annular base portion for supporting the bottom of a tube 15 thereon and a peg coaxially mounted to the annular collar portion of a diameter corresponding to the inside diameter of a tube 15 for snugly receiving a tube inserted thereon. The ferromagnetic component of the package support member 13 includes an annular ring 34 disposed about the circumference of its annular base portion and secured thereto by conventional securement means such as, for example, adhesive means. The outer circumference of the annular ring 34 is covered with a magnetically-neutral coating 55 which can be, for example, formed of plastic material. The annular metal ring 34 is formed of a ferromagnetic material which is magnetically active.

Another type of tube support member 13 suitable for use in the tube transport assembly of the present invention is illustrated in FIG. 8 and includes an annular ring 34' disposed in an annular slot formed in the outer circumference of the annular base portion of the tube support member 13'. The annular ring 34' has a radial extent less than the radial extent of the slot formed in the annular base portion so that the outer surface of the annular ring 35' is spaced radially inwardly of the outer circumference of the annular base portion and protected thereby.

In FIG. 9, the ferromagnetic component of a further type of tube support member includes an annular ring 34" which forms a tapering surface of the base portion of a tube support member 13". The annular ring 34' includes an outer surface tapering inwardly relative to the annular base portion in the direction toward the bottom of the tube support member 13".

The magnetic component of the guiding means of the tube transport assembly includes, as seen in FIG. 1, a conventional electromagnetic device 16 operatively connected via a connector 16' to a control unit 17". Additionally, the magnetic component includes a second conventional electromagnet 17 operatively connected via a connector 17' to the control unit 17" and disposed adjacent the travel path of the main supply belt 4 at a location downstream of the electromagnet 16. The control unit 17" is operatively connected via a connector 16" to a sensor 50.

The magnetic component of the tube transport assembly additionally includes a sensor 18 disposed adjacent the travel path of the main supply belt 4 downstream of the electromagnets 16, 17 and operatively connected via a connector 18" to the control unit 17". An electromagnet 19 is disposed adjacent the junction of the main supply belt 4 and the branch support member 20 and is operatively connected via a connector 18' to the control unit 17". This electromagnet is shaped in relation to the junction to pull tube support members from the main supply belt 4 onto the branch support member 20 when the electromagnet is energized.

Although the magnetic component of the tube transport assembly includes additional elements, the operation of the electromagnets 16, 17 and 19 will now be described to illustrate the guiding operation of the tube transport assembly through the magnetic interaction between the tube support members 13 and the electromagnets. The electromagnets 16, 17 can be operated by the control unit 17" in conjunction with the sensing of the sensor 18 to create magnetic attraction of the tube support member by the electromagnets and to stop advancement of the attracted tube support member along the delivery route and thereby control the traffic flow of the tube support members 13 to the winding stations. For example, the transport of the tube support members 13 by the main supply belt 4 can be controlled to insure that each tube support member 13 lags behind the immediately preceding tube support member by a predetermined time lag so that, for example, an undesired overloading of the branch support member 20 and/or the final supply belt 7 can be avoided. If such a predetermined time lag between each adjacent pair of the tube support members 13 is introduced before the tube support members reach the junction of the main supply belt 4 and the branch support member 20, the diversion of the selected tube support members onto the support member 20 can be facilitated. Additionally, if yarn end preparation devices are positioned along the travel path of the main supply belt 4, the introduction of a predetermined time lag between the travel of the adjacent tube support members 13 can facilitate the orderly feeding of the yarn packages 14 to the yarn end preparation devices for preparation of their yarn ends.

Effective magnetic interaction of the respective electromagnets 16, 17 with the ferromagnetic components of the tube support members 13 is achieved, for example, by having the electromagnets 16, 17 laterally aligned with and having surface configurations complementary with the surfaces of the ferromagnetic components on the tube support members.

The tube support members 13, which support the full yarn packages 14 thereon, are conveyed by the main supply belt 4 toward the electromagnets 16, 17. After travel of the first oncoming tube support member 13 beyond the electromagnet 17, the control unit 17" selectively operationally disposes the electromagnet 17 for magnetic interaction with the ferromagnetic component of the next oncoming tube support member 13 by controlling the flow of electricity from a conventional electrical source (not shown) to the electromagnet 17 to magnetically activate the electromagnet. At the same time, the control unit 17" blocks the flow of electrical current to the electromagnet 16 so the electromagnet 16 remains magnetically neutral so that the support members can freely pass thereby. The electromagnet 17 magnetically interacts with the ferromagnetic component of the first oncoming tube support member 13 and the strength of the magnetic interaction is controlled to a level sufficient to insure that the first engaged tube support member 13 remains in a relatively stationary position adjacent the electromagnet 17 despite continued driving operation of the main supply belt 4 which frictionally engages the bottom of the engaged tube support member.

The tube support member immediately following the engaged tube support member 13 is moved by the driving operation of the main supply belt 4 into abutment with the engaged tube support member 13 and each of the following tube support members 13 move into abutment with the immediately preceding tube support member in similar manner. Subsequent to the magnetic activation of the electromagnet 17 by the control unit 17" to engage the first engaged tube support member 13, the control unit 17" electrically activates the electromagnet 16 and deactivates the electromagnet 17. As a result, the first tube support member 13 is released for travel on the main supply belt 4 and the next tube support member is magnetically engaged by the now-activated electromagnet 16 and held relatively stationary adjacent the electromagnet 16, and the tube support members following the second engaged tube support member are held in serial abutment with one another by the driving operation of the main supply belt 4. After momentary deactivation of the first electromagnet 17, the second electromagnet 16 is momentarily deactivated to permit the next tube support member to advance on the belt 4 and the first electromagnet 17 is again activated to engage and stop the next tube support member in readiness for subsequent release.

The first released tube support member 13 travels downstream from the electromagnets 16,17 past the sensor 18 which transmits a signal via the connector 18" to the control unit 17" indicating the passage therepast of the first oncoming tube support member. The control unit 17" interprets this signal from the sensor 18 as an indication that the next tube support member 13 currently engaged by the electromagnet 17 can now be released for further downstream travel. The control unit 17" accordingly blocks the flow of electrical current to the electromagnet 17 and thereby interrupts the magnetic activation of the electromagnet to effect a cessation of the magnetic interaction between the electromagnet and the first engaged tube support member 13.

When the control unit 17" has received a signal from the sensor 18 that the tube support member previously engaged by the electromagnet 17 has now passed downstream beyond the sensor 18, the control unit 17" evaluates this signal to determine if a predetermined time corresponding to the desired lag between each tube support member has passed. If the actual time lag between the travel of the tube support member just sensed by the sensor 18 and the tube support member now engaged by the electromagnet 17 is at least equal to or greater than the predetermined time lag, the control unit 17" blocks the flow of electrical current to the electromagnet 17 to effect release of the tube support member 13 engaged thereat for further downstream transport by the main supply belt 4.

Figure 2:
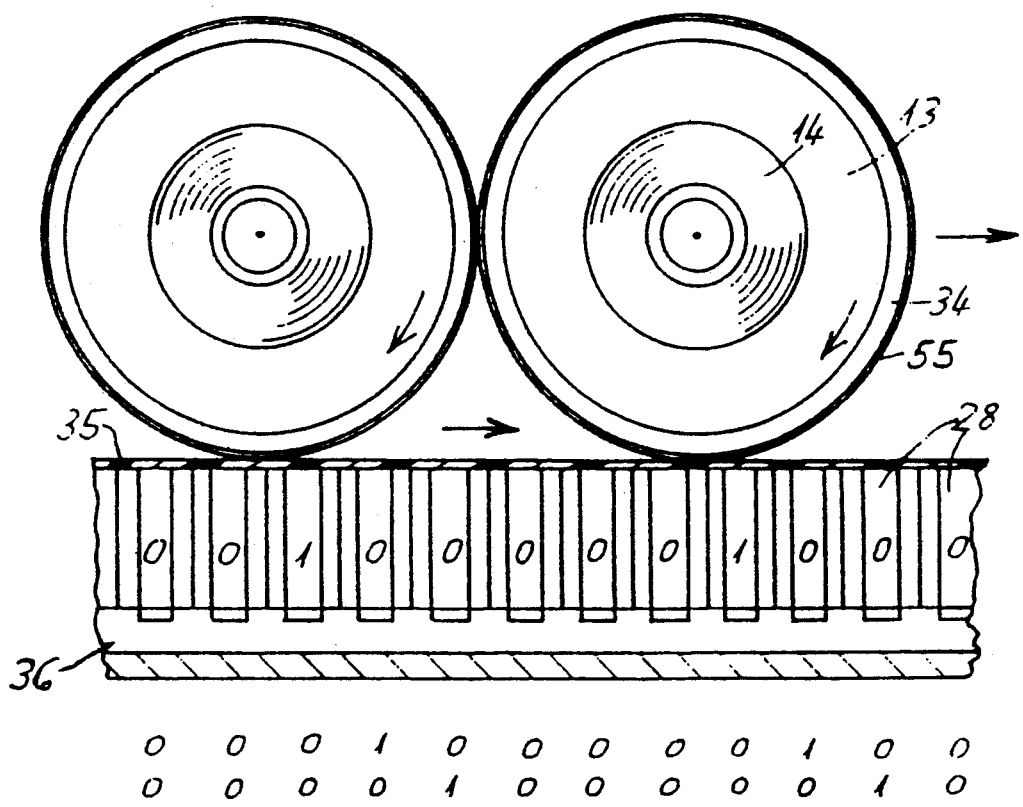
FIG. 2 is an enlarged plan view of a portion of the tube transport assembly of in FIG. 1, showing the electromagnetic means of the tube transport assembly at a winding station.

With further reference to the components of the tube transport assembly of the present invention, as seen in FIGS. 1 and 2, a sliding support member 27 extends through each winding station of the winding machine 1 and is operable to continuously divert tube support members from the final supply belt 7 for feed to the respective winding stations 2. A row of electromagnets 28 are disposed along one lateral side of each sliding support member 27 with the electromagnets 28 being along alternate sides of alternate winding stations so that each row is conveniently associated with an adjacent row of an adjacent winding station. Each row of electromagnet 28 associated with a respective winding station 2 is connected to a plurality of sensors 22-25, each of which is operatively connected via a connector 22'-25', respectively, to a central control unit 33.

A conventional means for selectively retaining the tube support members 13 at the yarn winding location of each winding station 2 for winding of the yarn package 14 supported thereon can be in the form, for example, of a conventional hydraulic cylinder and piston assembly 26 having a tube support member engaging component 26" disposed on the free end of its piston and operatively connected via a connector 33' to the respective central control unit 33. The cylinder and piston assembly 26 is selectively controlled by the central control unit 33 to extend its tube support member engaging component 26" into engagement with a tube support member 13 at the yarn winding location of the respective winding station 2 and to retract its piston to move its tube support member engaging component 26" out of engagement with the respective tube support member 13 at the yarn winding location. The cylinder and piston assembly 26 is operatively connected via a connector 26' to a conventional electronic yarn sensor (not shown) which senses the presence or absence of a yarn traveling from a yarn package 14 being unwound at the yarn winding location.

As seen in FIG. 2, the electromagnets 28 of each plurality of electromagnets are retained in a uniform spacing from one another by mounting in a housing 36 and the ends of the electromagnets 28 facing the travel path of the sliding support member 27 are commonly coated with a magnetically neutral coating 35 which can be, for example, formed of plastic. As seen in FIG. 8, the coating 35 can be provided as well over the top and bottom of the electromagnets 28.

A row of four sensors 22-25 are disposed at each winding station 3 along the side thereof opposite the side along which the row of electromagnets 28 are disposed upstream of the yarn winding location and the fourth sensor 25 is disposed downstream of the yarn winding location.

The operation of the tube transport assembly for transporting the tube support members 13 from the yarn package receiving location along the delivery route 3, through the winding stations 2 and thereafter along the discharge belt 29 to the empty tube transfer location will now be described. The tube support members 13, each supporting a yarn package 14 thereon, are transported by the main supply belt 4 along the delivery route 3 for feeding to the winding stations 2. The electromagnets 16, 17 are operated as described above under the control of the control unit 17" to control the feed of yarn packages such as, for example, by introducing a predetermined uniform time lag between the travel of each adjacent tube support member 13 along the delivery route 3. As each of the tube support members 13 is transported adjacent the electromagnet 19 by the main supply belt 4, the control unit 17" controls the electromagnet 19 to selectively divert tube support members 13 onto the support member 20 and permit others of the tube support members 13 to continue to be transported by the main supply belt 4 to another handling location such as, for example, another section of the winding machine or to another winding machine. The control unit 17" can be designed to divert the tube support members 13 from the travel path of the main supply belt 4 in accordance with, for example, a predetermined feed pattern such as, for example, a feed pattern in which every other tube support member 13 is diverted from the main supply belt 4 for feeding to the winding machine 1. To implement such a feed pattern, the control unit 17" magnetically activates the electromagnet 19 in response to the sensing of a tube support member 13 by the sensor 18 and correspondingly de-activates the electromagnet 19 in correspondence with the sensing by the sensor 18 of every other tube support member 13 traveling therepast.

The sensor 18 can be alternatively provided with conventional color sensing means for sensing the color of each tube support member 13 or tube 15 traveling therepast and the control unit 17" can be designed to selectively magnetically activate the electromagnet 19 in correspondence with the sensing of a predetermined color by the sensor 18. The coloring on the tube support member 13 or the tubes 15 can correspond, for example, to the particular batch in which the respective yarn packages 14 were wound.

Those tube support members 13 diverted onto the support member 20 slide therealong onto the final supply belt 7. The final supply belt 7 is operated in a cyclically reversing manner to continuously transport the tube support members 13 into contact with the upstream ends of the sliding support members 27 of the winding stations. A sensor 50, which is positioned adjacent the travel path of the endless final supply belt 7 at a full load location relatively slightly offset from the tube support member stop component 12, transmits a signal via the connector 16" to the control unit 17" in response to sensing by the sensor 50 of a fully loaded condition of the final supply belt 7. For example, if the sensor 50 senses the presence of a tube support member 13 thereadjacent on the final supply belt 7 generally at the time at which the motor 10 is controlled to reverse the travel direction of the final supply belt 7 to travel in the direction of the drive roller 10', this signal can be interpreted by the control unit 17" as an indication that the final supply belt 7 is fully loaded with tube support members 13. In response thereto, the control unit 17" can be designed to prevent the further feeding of the tube support members 13 to the final supply belt 7 by deactivating the electromagnet 19 diverting tube support members to the branch support member or activating the electromagnets 16, 17 that prevent tube support members from advancing on the main supply belt 4 until the final supply belt 7 is no longer full.

The sliding support members 27 are continuously fed with tube support members from the final supply belt 7 during the travel of the final supply belt 7 since the tube support members partially overlap the sliding support members 27 which thereby engage the overlapping portions of the tube support members and remove them from the belt 7. The control unit 33 controls the magnetic activation o the electromagnets 28 to effect controlled movement of the tube support members 13 to and from the winding stations 2 along the sliding support members 27. As seen in FIG. 2, the electromagnets of each respective row of electromagnets 28 are individually sequentially magnetically activated to effect controlled movement of the tube support members 13 into and through the winding stations.

One exemplary pattern of the magnetic activation of the electromagnets 28 is schematically illustrated in FIG. 2. Each numeral 0 represents an electromagnet in a non-activated state and each numeral 1 indicates an electromagnet in a magnetically activated state. Initially, the third and ninth electromagnets, as viewed from the left in FIG. 2, are simultaneously activated. The control unit 33 thereafter sequentially magnetically activates the individual electromagnets 28 by magnetically de-activating the third and ninth electromagnets and, simultaneously, magnetically activating the fourth and tenth electromagnets 28, as schematically represented by the first line of numerals below the cabinet 36. Thereafter, the control unit 33 simultaneously magnetically de-activates the fourth and tenth electromagnets 28 and magnetically activates the fifth and eleventh electromagnets, as schematically represented by the second line of numerals below the cabinet 36 in FIG. 2. The sequential magnetic activation of progressively further downstream individual electromagnets 28 causes, by magnetic attraction, corresponding translational rotation of the tube support members 13 (in the clockwise direction as seen in FIG. 2) to thereby effect controlled movement of the tube support members through the winding station 2. Translational rotation is to be understood as the simultaneous rotation of each tube support member 13 about its axis and the movement of the tube support member along the travel path of the sliding support member 27.

The rotating tube support members 13 roll along the electromagnets in the direction of the currently magnetically activated individual electromagnet 28 due to the magnetic interaction between the ferromagnetic component of the tube support member and the magnetically activated individual electromagnet. Since each of the tube support members 13 is provided with the magnetically neutral coating 55, as shown in FIGS. 2 and 7, the translational rotational movement of the tube support members 13 along the coating 35 of the plurality of the electromagnets 28 is relatively smooth and beneficially minimizes the occurrence of magnetically interfering dust or debris which could arise from the metal to magnet contact of an exposed ferromagnetic component of a tube support member 13 and the electromagnets 28.

The control unit 33 sequentially magnetically activates the electromagnets 28 associated with each winding station 2 to insure that each of the sliding support members 27 is fully loaded with tube support members 13 for advancement to the winding stations 2. The sensors 22-24 sense the presence of the tube support members at respective locations along the travel path of the belts 27 and transmit this information to the control unit 33.

The control unit 33 evaluates the sensing by the sensors 22-24 of the presence of the tube support members 13 thereadjacent as an indication that the sliding support member 27 is fully loaded with tube support members for feeding to the respective winding station 2. The control unit 33 ceases its sequential magnetic activation of the electromagnets 28 in response to the sensing by the fourth sensor 25 of the respective winding station that a tube support member 13 is traveling therepast, which is evaluated by the control unit 33 as an indication that the tube support member 13 which was just located at the yarn winding location has passed downstream of the sensor 25 and that a fresh yarn package 14 has been advanced into the yarn winding location.

The cylinder and piston assembly 26 retracts its tube support member engaging component 26" in response to a signal from the conventional yarn sensor of the winding station that the yarn package 14 supported on the respective tube support member 13 has been fully unwound or that no further unwinding is occurring (because, for example, of a yarn break situation). The respective tube support member 13 is thereafter transported downstream past the sensor 25 and the next following tube support member is advanced to the yarn winding location through the sequential magnetic activation of the electromagnets 28 by the control unit 33.

In FIG. 8, an advantageous form of the sliding support members 27 is illustrated. Each sliding support member 27 includes a pair of parallel laterally outward rails 27' and an intermediate rail 27" and extending between and parallel thereto. The rails 27', 27" extend from an upstream location adjacent the travel path of the final supply belt 7 to a downstream location adjacent the travel path of the discharge belt 29. The top surface of the intermediate rail 27" is disposed at a relatively slightly higher horizontal plane than the top surfaces of the rails 27'. This configuration of the sliding support member 27 advantageously reduces the frictional resistance of the sliding support member to the rotational movement of the tube support members 13 therealong. As each tube support member 13 is rotatingly advanced along the sequentially magnetically activated electromagnets 28, its ferromagnetic component such as, for example, the ferromagnetic component 34' seen in FIG. 8, is generally horizontally aligned with the respective magnetically activated individual electromagnet 28 by magnetic attraction and the tube support member 13 such as, for example, the tube support member 13' seen in FIG. 8, is supported solely on its bottom by the intermediate rail 27" so that only the top surface of the intermediate rail 27" offers frictional resistance to the rotation of the tube support member 13'. The rails 27' provide support to the tube support member 13' during those periods in which the electromagnets 28 are de-activated.

The controlled feeding of the tube support members 13 from the yarn package receiving location to the final supply belt 7 insures that the final supply belt 7 is not overloaded with tube support members 13 to the extent that the tube support members detrimentally press upon the tube support members already loaded on the sliding support members 27 and thereby interfere with the orderly controlled movement of these tube support members in advancing direction toward the winding stations 2. Additionally, this controlled feeding of the tube support members provides the capability to selectively retain tube support members 13 which have been advanced beyond the yarn winding locations at the winding stations 2 in the event that the discharge belt 29 is fully loaded with tube support members being advanced toward the empty tube transfer location.

The present invention also contemplates that the electromagnets 28 of each respective row of electromagnets can be magnetically activated to opposite magnetic polarities in an alternating manner. For example, every other one of the electromagnets 28 can be activated with a negative magnetic polarity and the alternate electromagnets can be activated with a positive magnetic polarity. This arrangement assures that the path of magnetic energy extends from a respective one of the magnetically oppositely activated individual electromagnets directly through the ferromagnetic component of the engaged tube support member 13 to the other, thereby creating a reliable interaction between the electromagnets 28 and the tube support members 13.

The second and third sensors 23, 24 in each winding station may be omitted if desired.

Figure 3:
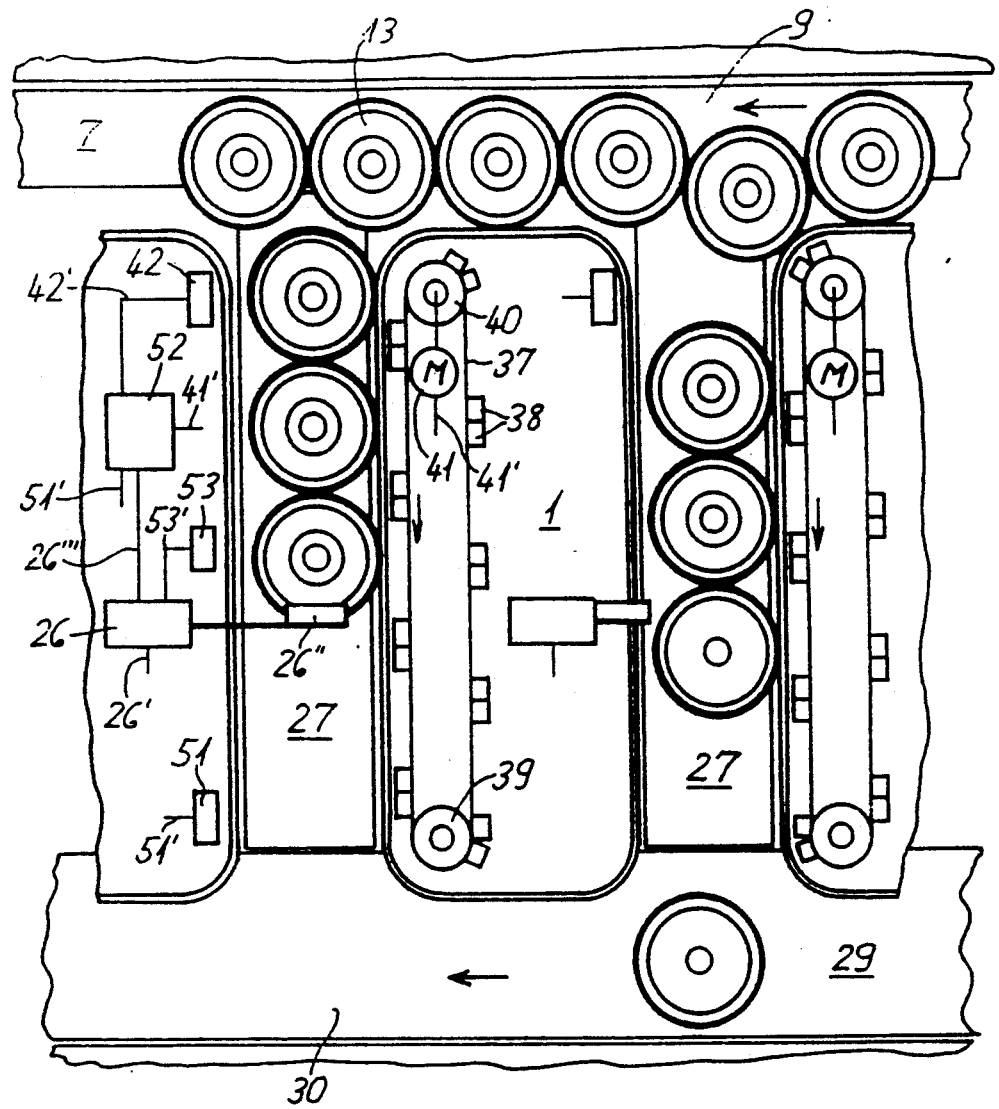
FIG. 3 is a plan view of a portion of the textile winding machine of FIG. 1, showing a modification of the embodiment of the tube transport assembly of FIG. 1.

In FIG. 3, a modification of the tube transport assembly of the present invention is illustrated. In lieu of the row of electromagnets 28 illustrated in FIG. 1, an endless moving magnet assembly is provided which includes a plurality of permanently magnetically activated magnets 38 secured at uniform spacings on a conventional flexible endless belt 37 trained around a guide roller 39 and a drive roller 40. The drive roller 40 is operatively connected to a drive motor 41 for driving operation of the belt 37 and the drive motor 41 is operatively connected via a connector 41' to a control unit 52. A sensor 42 is disposed adjacent the travel path of the tube support members 13 along the sliding support member 27 upstream from the yarn winding location and is operatively connected via a connector 42' to the control unit 52. A second sensor 53 is disposed adjacent the travel path of the tube support members at the yarn winding location and is operatively connected via a connector 53' to the cylinder and piston assembly 26 associated with the respective winding station 2. The cylinder and piston assembly 26 is operatively connected via a connector 26''' to the control unit 52. A sensor 51 disposed adjacent the travel path of the tube support members 13 along the sliding support member 27 at a location downstream of the yarn winding location is operatively connected via a connector 51' to the control unit 52.

The modified tube transport assembly illustrated in FIG. 3 operates as follows. The tube support members 13 are transported by the final supply belt 7 during its cyclically reversing movements and the tube support members slide onto the sliding support members 27 during transport therepast. The cylinder and piston assembly 26 transmits a signal via the connector 26''' to the control unit 52 indicating that the tube support member engaging component 26" has been retracted from its engaging position. In response to this signal, the control unit 52 controls the motor 41 via the connector 42' to drivingly operate the belt 37. The belt 37 is driven in a direction which continuously brings the permanent magnets 38 secured thereto into adjacent relation with the travel path of the sliding support member 27. The permanent magnets 38 pass sufficiently close to the travel path of the tube support members 13 supported on the sliding support member 27 such that magnetic interaction occurs between the permanent magnets and the tube support members to effect transport of the package support members from the upstream end of the sliding support member 27 to the yarn winding location.

Once the driving operation of the belt 37 has effected movement of a tube support member into the yarn winding location, the sensor 53 adjacent the yarn winding location transmits a signal via the connector 53' to the cylinder and piston assembly 26 to return its tube support member engaging component 26' to its package engaging position transverse the travel path of the sliding support member 27 to engage the respective sensed tube support member 13. The sensor 53 is preferably positioned at a height for sensing the collar portion of the tube support members 13 traveling therepast. Additionally, the sensor 53 can be configured to sense the open space between adjacent tube support members 13 traveling along the sliding support member 27. The sensing of an open space could be interpreted as an indication that no further tube support members 13 are traveling along the respective sliding support member 27, in response to which the belt 37 carrying the electromagnets 38 need not be operated.

The control unit 52 continues to operate the motor 41 to drive the belt 37 until a signal is received from the sensor 51 indicating that no tube support member 13 is traveling therepast, which means that a tube support member has been stopped at the winding location.

The permanent magnets 38 are preferably secured to the belt 37 in pairs and the spacing between each adjacent pair of permanent magnets preferably corresponds to approximately the diameter of the annular base portion of a tube support member 13. Moreover, the present invention additionally contemplates that each permanent magnet of each pair of permanent magnets has a magnetic polarity opposite to the magnetic polarity of the other of the pair of permanent magnets 38. Such a configuration beneficially increases the magnetic interaction between the ferromagnetic component of the tube support members 13 and the permanent magnets 38.

The tube support member engaging component 26" at the winding location preferably tapers toward the free end of the piston of the cylinder and piston assembly 26 in the travel direction of the tube support members 13 along the sliding support member 27 to facilitate smooth extension of the tube support member engaging component 26" into engagement with an oncoming tube support member 13.

In a further modification of the tube transport assembly shown in FIG. 3, the magnet carrying belt 37 can be conventionally operatively connected to the drive motor which drives the discharge belt 29 by, for example, a conventional bevel gear assembly having one bevel gear mounted to the shaft of a roller rotatingly driven by the discharge belt 29 and a mating bevel gear mounted to the shaft of a drive roller for driving the belt 37. In yet another modification of the tube transport assembly shown in FIG. 3, the magnet moving belt can be disposed below the sliding support member 27. In such a configuration, the ferromagnetic component of each tube support member 13 can be formed out of a mixture of plastic and ferromagnetic material. Additionally, the ferromagnetic component can be disposed on the underside of each tube support member 13 such as, for example, in the form of a metal plate formed by a mold process on the bottom of the tube support member. The metal plate preferably would be formed with a metallic rim portion to thereby reduce the surface area of the tube support member 13 which can be detrimentally frictionally engaged by the sliding support member 27.

Figure 4:
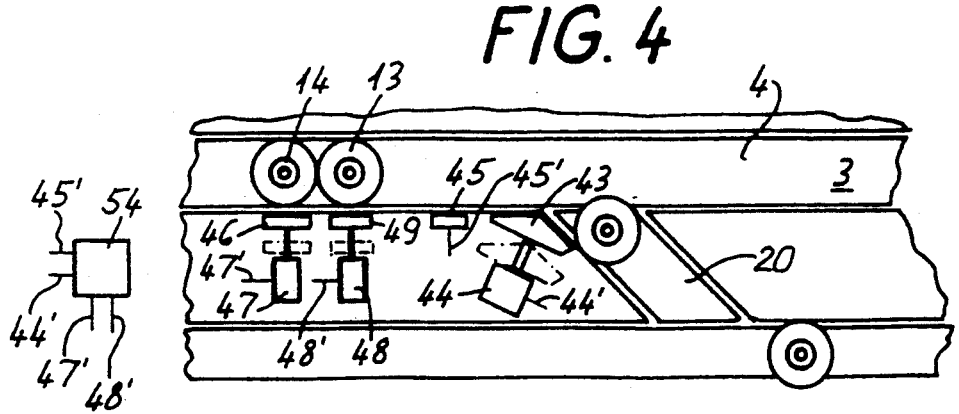
FIG. 4 is a plan view of a portion of the textile winding machine of FIG. 1, showing another modification of the embodiment of the tube transport assembly of FIG. 1.

In FIG. 4, an alternative configuration of the tube support member traffic controlling arrangement along the delivery route 3 shown in FIG. 1 is illustrated. In lieu of the electromagnets 16, 17 and 19, the alternative configuration includes a pair of permanent magnets 46, 49 each connected to the free end of a piston of a respective hydraulic cylinder and piston assembly 47, 48, respectively. The cylinder and piston assemblies 47, 48 are operatively connected via a connector 47', 48', respectively, to a control unit 54.

Each cylinder and piston assembly 47, 48 is operable to extend its piston to move the respective permanent magnet 46, 49 from a non-engaging position displaced from the travel path of the tube support members 13 along the main supply belt 4, as shown in the broken lines in FIG. 4, to a magnetic engaging position more closely adjacent the travel path of the tube support members 13 along the main supply belt 4, as shown by the solid line position in FIG. 4, for magnetically engaging the tube support members 13 transported therepast. The engaging position of the permanent magnet 46 is upstream of the engaging position of the permanent magnet 49 relative to the direction of travel of the tube support members 13 on the main supply belt 4.

A permanent magnet 43 has a pair of connected surfaces defining an obtuse angle therebetween corresponding to the obtuse angle between the main supply belt 4 and the branch support member 20 and is disposed adjacent the junction of the main supply belt 4 and the branch support member 20 with one surface adjacent the main supply belt and the other surface adjacent the branch support member. The permanent magnet 43 is secured to the free end of the piston of a hydraulic cylinder and piston assembly 44. The cylinder and piston assembly 44 is operatively connected via a connector 44' to the control unit 54. The permanent magnet 43 is movable from a non-engaged position displaced from the travel paths of the tube support members 13 along the main supply belt 4 and the support member 20, as shown by the broken line position in FIG. 4, and an engaging position adjacent both the travel path of the tube support members 13 along the main supply belt 4 and along the branch support member 20, as shown by the solid line position in FIG. 4, for engaging tube support members 13 traveling therepast and directing them from the main supply belt 4 onto the branch support member 20.

A sensor 45 is disposed adjacent the travel path of the main supply belt 4 intermediate the permanent magnet 14 and the permanent magnet 43 and is operatively connected via a connector 45' to the control unit 54. The control unit 54 controls the movement of the permanent magnets 46, 49 and 43 between their respective non-engaged positions and their engaged positions to selectively operatively dispose the permanent magnets for magnetic interaction with the ferromagnetic components of the tube support members 13 traveling therepast. The control unit 54 can be designed to selectively dispose the permanent magnets 46, 49 and 43 in their respective positions in correspondence with the electrical flow pattern discussed with respect to the tube transport assembly shown in FIG. 1 to effect controlled movement of the tube support members 13 along the main supply belt 4 and along the support member 20.

Figure 5:
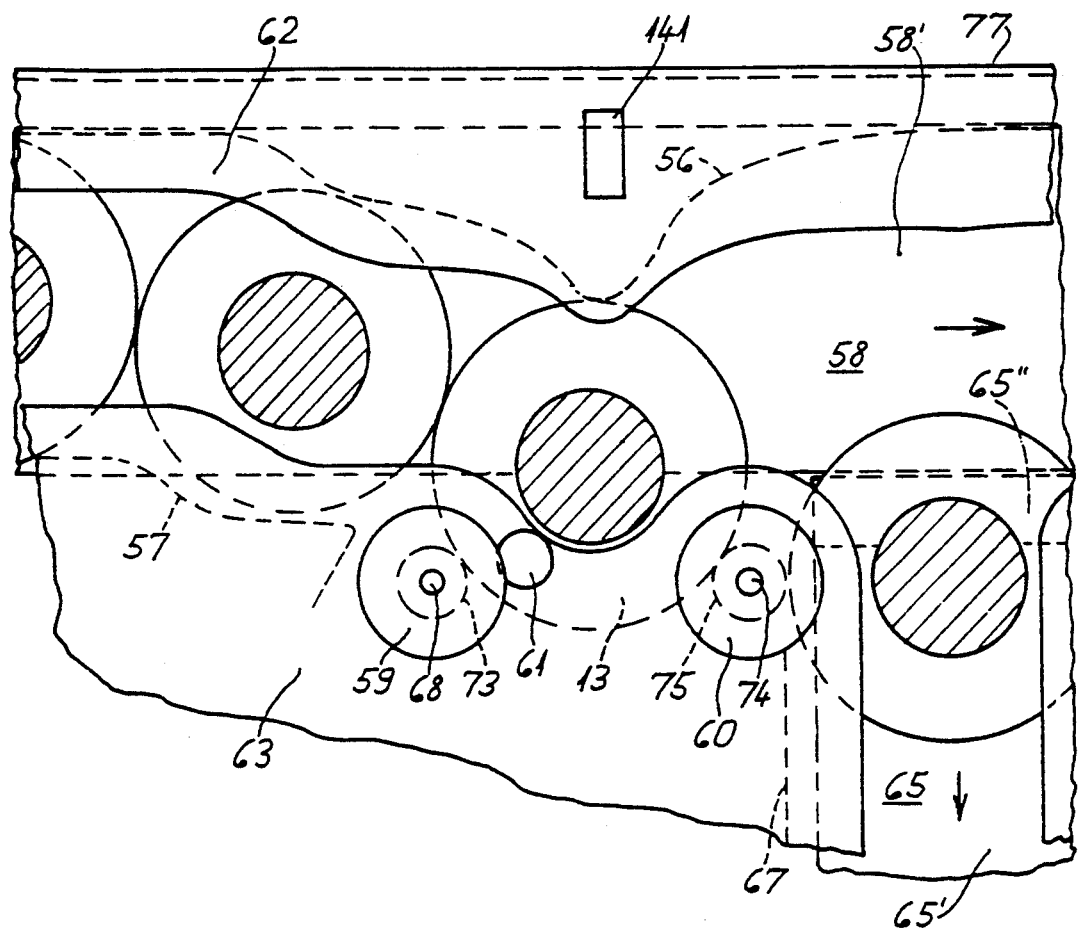
FIG. 5 is an enlarged plan view of a portion of a textile winding machine and showing another form of the embodiment of the tube transport assembly of FIG. 1.

In FIG. 5, another aspect of the tube transport assembly of the present invention is illustrated. A section of the main supply path 3 or final supply path 7 discussed with respect to the embodiment in FIG. 1 can be provided with a means for selectively guiding the tube support members onto a branch leading to, for example, the final supply path or to a winding station. The guiding means includes a pair of guide plates 63, 62 supported on a frame 77 of the textile machine and having complementarily configured edge portions 56, 57, respectively, for guiding tube support members along a path 58 having a flexible endless belt 58' on which the tube support members are transported.

The edge portions 56, 57 are disposed in a common horizontal plane corresponding to the horizontal orientation of the annular base portions of the tube support members for guiding engagement therewith. An electromagnet assembly 59 is disposed on one respective lateral side of the belt 58' and is fixedly secured to the frame 77 by a securement post member 68. The electromagnet assembly 59 includes an annularly shaped magnetically activatable component 73.

A second electromagnet assembly 60 is secured by a securement post member 74 to the frame 77 to the same respective lateral side of the belt 58' at a location downstream of the electromagnet assembly 59. The electromagnet assembly 60 includes an annularly shaped magnetically activatable component 75.

The guide plate 63 forms a branch path 65 branched from the travel path 58 of the belt 58' at a junction immediately downstream of the location of the electromagnet assembly 60. The branch path 65 includes a conventional flexible endless belt 65' trained around a conventional guide roller 65'' at its upstream end adjacent the belt 58' and is trained around a conventional drive assembly (not shown) for driving operation of the endless belt. An edge portion 67 formed on the guide plate 63 extends along one side of the endless belt 65' for guiding engagement of the annular base portion of the tube support members traveling along the transport path 65. A sensor 61 is positioned adjacent the electromagnet assembly 59 and is operatively connected via a conventional connector (not shown) to the electromagnet assembly 59.

The tube support members are transported along the branch path 58 on the belt 58' and are guided along predetermined lateral orientations relative to the endless belt 58' by the edge portions 56, 57. The guide plates 62, 63 extend toward one another beyond their respective edge portions 56, 57 such that a portion of the annular base portion of each tube support member guided therealong is beneath the guide plates 62, 63. This configuration advantageously prevents tipping of the tube support members during their transport. As the tube support members approach the electromagnet assembly 59, the edge portions 56, 57 guide the tube support members into increasingly laterally offset positions relative to the belt 58' toward the lateral side of the belt on which the electromagnet assembly 59 is positioned.

The annular component 73 of the electromagnet assembly 59, which is magnetically activated under the control of a control unit (not shown), magnetically engages the ferromagnetic component of the approaching tube support member, which is still partially supported on the endless belt 58'. The continued operation of the belt 58' moves the respective engaged tube support member further downstream while its ferromagnetic component is engaged by the annular component 73.

The sensor 61 senses the travel therepast of the engaged tube support member and signals the control unit, which responds to the receipt of the signal by energizing the annular component 75 of the electromagnet assembly 60. The engaged tube support member continues to move downstream relative to the direction of the belt 58' due to the operation of the belt and the engaged tube support member rotates slightly due to the engagement of its annular base portion by the annular component 73 of the first electromagnet assembly 59. Eventually, the annular base portion of the engaged tube support member is magnetically engaged by the annular component 75 of the second electromagnet assembly 60 at a circumferentially spaced location from the engagement thereof by the first electromagnet assembly 59. With both the electromagnet assemblies 59, 60 energized, the engaged tube support member is supported in a stationary position relative to the belt 58'. A conventional sensor 141 is disposed for sensing the yarn package 14 supported on a tube support member retained at this stationary location. The sensor 141 is connected via a conventional connector (not shown) to the control unit and transmits a signal thereto corresponding, for example, to the sensed condition of the yarn on the supported yarn package 14 or, for example, corresponding to the sensed batch identification means on the tube 15 on which the yarn package 14 is built.

In correspondence with the sensing signal received from the sensor 141, the control unit selectively controls the magnetic energization of the electromagnet assemblies 59, 60 to effect guiding of the engaged tube support member in a manner in which the tube support member continues to travel along the direction of travel of the belt 58' past the junction with the transport past 65 or in a manner in which the tube support member is guided from the transport path 58 onto the transport path 65. If the engaged tube support member is to continue traveling along the belt 58', the control unit magnetically de-energizes the electromagnetic assemblies 59, 60 to permit the continuous operation of the belt 58' to displace the engaged tube support member from its stationary location for further downstream transport by the belt.

In the event that the engaged tube support member is to be guided from the transport path 58 onto the branch path 65, the control unit magnetically de-energizes the first electromagnetic assembly 59 while the second electromagnetic assembly 60 continues to be magnetically energized. The continuing operation of the belt 58' causes the tube support member to rotate relative to its axis while it is moved further downstream by the belt and the annular base portion of the tube support member remains magnetically engaged by the annular component 75 of the second electromagnet assembly 60 and rolls therealong. The upstream end of the branch belt 65' then engages the bottom portion of the tube support member which extends laterally beyond one side of the belt 58' and cooperates with the continuing magnetic engagement of the tube support member by the second electromagnet assembly 60 to guide the tube support member from the transport path 58 onto the transport path 65 after which the second electromagnet assembly 60 is de-energized to permit the tube support member to travel along the branch path 65. In correspondence with the guidance of the tube support member onto the branch transport path 65, the control unit again magnetically energizes the first electromagnet assembly 59 to magnetically engage the next following tube support member to begin the next cycle of positioning a tube support member for sensing at the stationary location.

The additional aspect of the tube transport assembly illustrated in FIG. 5 provides the capability to individually stop, sense and guide the tube support members. Since all of the rotating parts of the guiding means are displaced from the travel path of the tube support members, the risk that a stray yarn end will be snagged by the guiding means is minimized.

Figure 6:
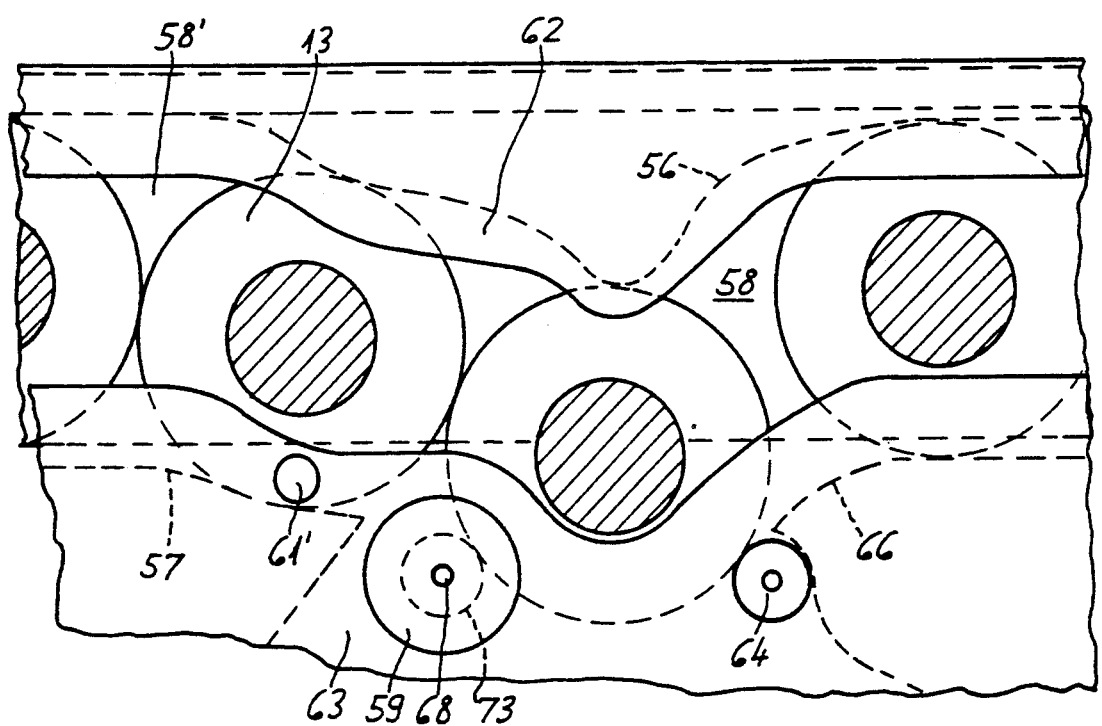
FIG. 6 is a plan view of a portion of a textile winding machine and showing a further form of the embodiment of the tube transport assembly of FIG. 1.

In FIG. 6, another aspect of the modified tube transport assembly of FIG. 5 is illustrated in which a selected portion of the predetermined travel path along which the tube support members 13 travel such as, for example, a portion of the main supply path 3, can be provided with a location at which the tube support members 13 are individually sequentially temporarily retained for a purpose such as, for example, sensing of the tube 15 or the yarn package 14 supported on the respective retained tube support member. In this configuration, the guide plates 62, 63 include contoured edge portions 56, 57, respectively, for guiding the tube support members laterally with respect to the endless belt 58' which transports the tube support member 13 along the transport path 58. The first electromagnet assembly 59 is positioned adjacent the travel path of the tube support members 13 at a location at which the tube support members have been moved partially laterally beyond a lateral side of the belt 58'.

A sensor 61' is disposed adjacent the travel path of the tube support members 13 upstream of the first electromagnet assembly 59 and is operatively connected to the control means (not shown) which selectively magnetically activates the first electromagnet assembly 59. A cooperating member in the form of an annularly shaped stop component 64 is positioned downstream of the first electromagnet assembly 59 at a spacing from the first electromagnet assembly less than the diameter of a tube support member 13.

The first electromagnet assembly 59 and the stop component 64 are operable to engage the annular base portion of a tube support member 13 at circumferentially spaced locations thereon to temporarily retain the engaged tube support member at a retaining location for sensing by a sensor (not shown) or other handling of the tube 15 or the yarn package 14 supported on the retained tube support member. As seen in FIG. 9, the first electromagnet assembly 59 includes a housing 76 supported on a post member 68. The post member 68 can be in the form, for example, of a conventional bolt and nut assembly for fixedly securing the first electromagnet assembly 59 to the frame 72 of the textile machine. A coil 69 is disposed within the housing 76 coaxial to the post member 68 and is spaced from the top inner surface of the housing 76 by a spacer member 71. The coil 69 is mounted on an iron core 70 which is coaxially fixedly mounted to the post member 68. The iron core 70 includes an inclined annular surface 73 which is inclined radially inwardly in the direction from the bottom toward the top of the post member 68. The housing member 76 includes a flange 63 positioned for overlappingly retaining the annular base portion of the tube support member.

The first electromagnet assembly 59 additionally includes a support plate 63' extending laterally outwardly from the iron core 70 toward the belt 58' under and supporting a tube support member 13" magnetically engaged by the first electromagnet assembly 59 at a predetermined vertical orientation in which the inclined annular ferromagnetic component 34" of the engaged tube support member is in substantial surface to surface contact with the inclined annular surface 73 of the iron core 70.

The first electromagnet assembly 59 is configured to magnetically interact with tube support members 13" of the type illustrated in FIG. 9. These tube support members 13" include an annular ferromagnetic component 34" at the circumference of their bottoms tapering radially inwardly toward at an inclination corresponding to the inclination of the inclined annular surface 73 of the first electromagnet assembly 59.

In operation, the belt 58' transports the tube support members 13 along the transport path 58 and the edge portions 56, 57 guide each oncoming tube support member 13 in increasingly laterally offset directions relative to the belt 58' in the vicinity of the sensor 61'. The sensor 61' senses the presence of an oncoming tube support member 13 and signals the control unit which magnetically activates the first electromagnet assembly 59 in response to the sensing by the sensor 61'. As the sensed tube support member 13 travels downstream relative to the sensor 61', it is magnetically engaged by the first electromagnet assembly 59 through the magnetic interaction between the iron core 70 and the ferromagnetic component 34' of the tube support member 13".

The first electromagnet assembly 59 magnetically interacts with the ferromagnetic component of the oncoming tube support member 13 to thereby engage the tube support member in opposition to the frictional engagement of the tube support member by the continuously moving belt 58'.

Once engaged by the iron core 70 of the first electromagnet assembly 59, the engaged tube support member translationally rotates as the annular inclined ferromagnetic component 34" remains in surface to surface contact with the annular inclined surface 73 of the iron core 70 while the retained tube support member is advanced further downstream under the action of the belt 58'. After a relatively small amount of downstream travel of the tube support member after its magnetic engagement by the first electromagnet assembly 59, the tube support member moves into engagement with the stop component 64 and no further downstream travel of the tube support member occurs despite the continuing operation of the belt 58'. The tube support member is thus temporarily retained by the cooperating operation of the first electromagnet assembly 59 and the stop component 64 so that, for example, a sensor (not shown) can be positioned for sensing the tube 15 or the yarn package 14 supported on the retained tube support member. After sensing of the supported tube 15 or the yarn package 14, the first electromagnet assembly 59 can be magnetically deactivated to permit the belt 58' to further advance the now-released tube support member 13 laterally around the stop component 64 and downstream along the transport path 58. A guide plate 66 can be provided extending from a location adjacent the stop component 64 and extending upstream therefrom relative to the direction of travel of the tube support members 13 for guiding the released tube support members 13 laterally inwardly onto the belt 58' into fully supported positions thereon for optimum transport of the tube support members by the belt 58'.

The present invention contemplates that the sensor 61 illustrated in FIG. 5 and the sensor 61' illustrated in FIG. 6 can be in the form, for example, of conventional inductively activated sensors configured to inductively sense the ferromagnetic components of the tube support members 13.

The modified tube transport assembly illustrated in FIGS. 5 and 6 advantageously guides the tube support members without exposing the yarn packages supported thereon to moving components which could detrimentally snag stray yarn ends or the like on the yarn packages. Additionally, the modified tube transport assembly reliably and smoothly transfers the tube support members from one transport path to another transport path at a junction between two transport paths.

Figure 10:
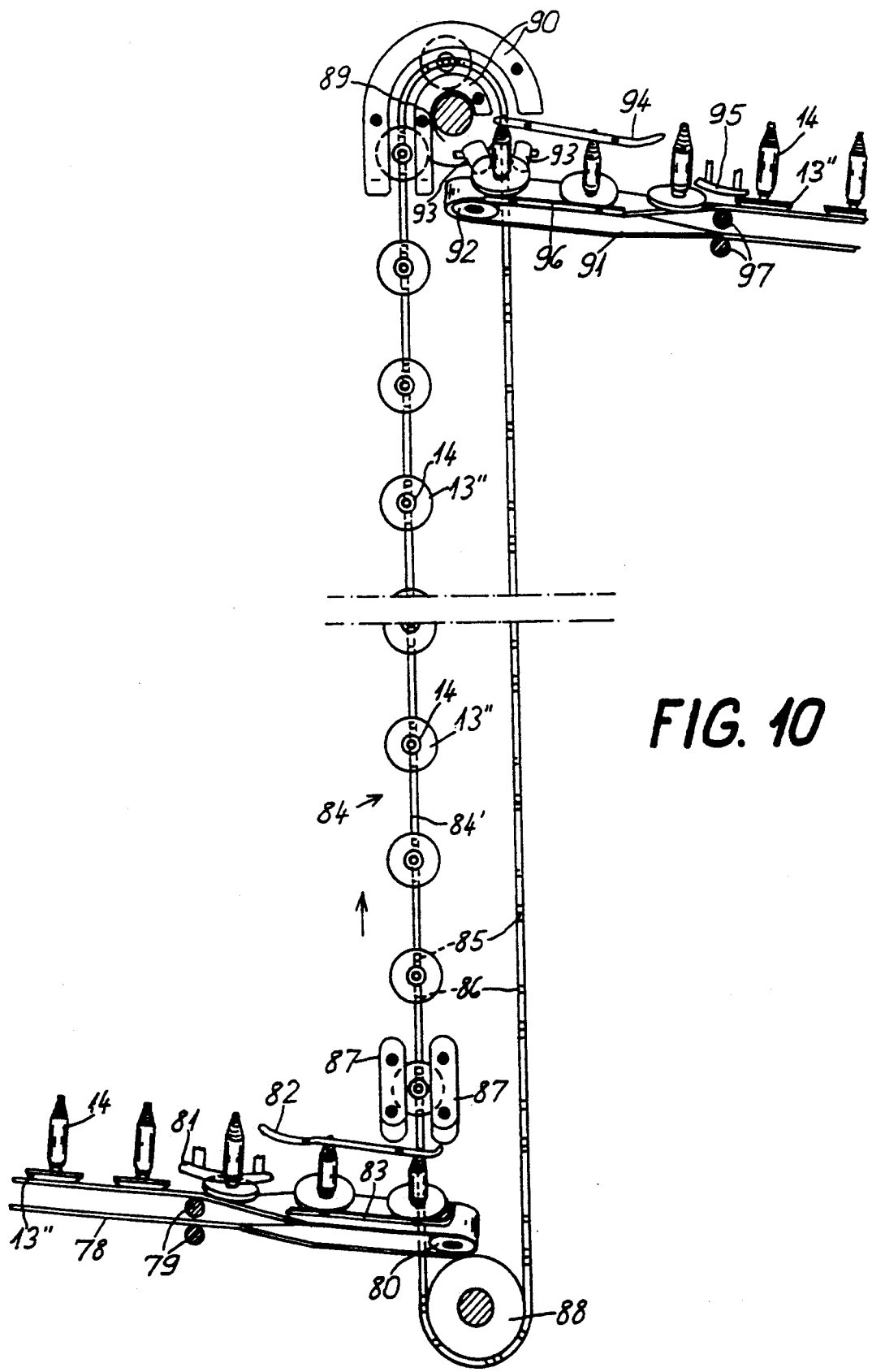
FIG. 10 is a front elevational view of a vertical transport component of the embodiment of the tube transport assembly shown in FIG. 1.
Figure 11:
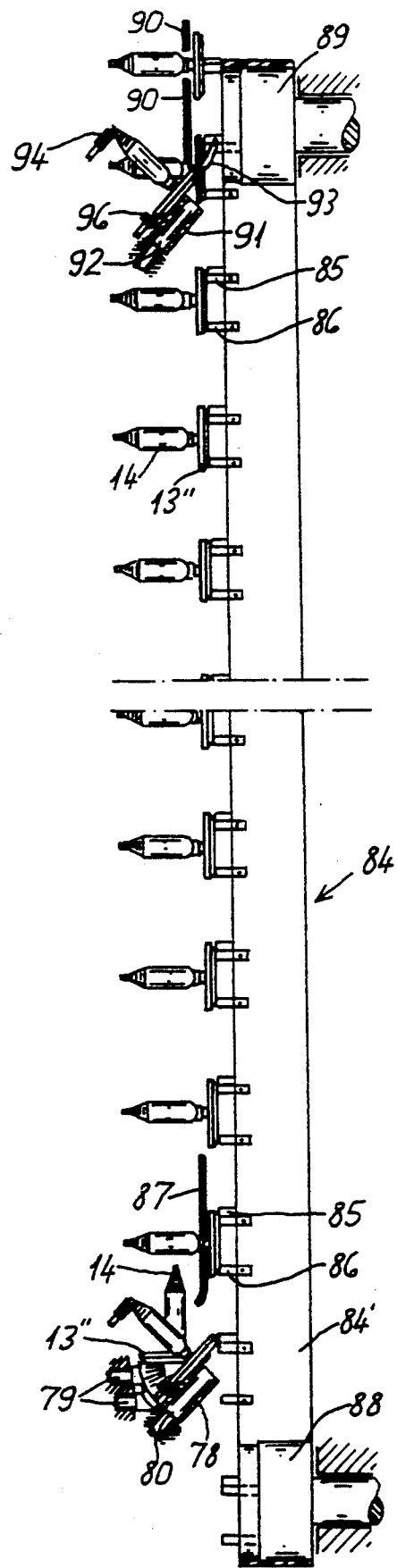
FIG. 11 is a side elevational view, in partial vertical section, of the vertical transport component shown in FIG. 10.

In FIGS. 10–15, features of the tube transport assembly of the present invention are illustrated which provide the capability to vertically transport the tube support members 13 between spaced vertical positions, thereby utilizing a minimum of floor space. One version of this feature is illustrated in FIGS. 10 and 11. The tube support members, which are of the type of tube support members 13" illustrated in FIG. 9 having annular inclined ferromagnetic components 34", are horizontally transported by a lower horizontal transport component having a conventional flexible endless member or belt 78 trained around a guide roller 80 at its downstream end and around a conventional drive roller (not shown) operatively connected to a conventional drive motor (not shown) for driving operation of the belt 78. The tube support members are transferred from the lower horizontal transport component to a vertical transport component 84 having carrier members and carrier member conveying means for conveying the tube support members between vertically spaced locations.

The lower horizontal transport component includes means for inclining the lateral orientation of the belt 78 for corresponding inclined orientation of the tube support members at its downstream end. The lateral orientation inclining means includes a pair of guide rollers 79, each disposed upstream of the guide roller 80 for supporting a respective one of the upper and lower runs of the belt 78 and a belt twist stop member 81 positioned adjacent the rollers 79 above the upper run of the belt 78 and a means (not shown) for supporting the guide roller 80 with its axis at an inclination with respect to the horizontal. The belt twist stop member 81 is sufficiently spaced from the upper run of the belt 78 to permit passage therebetween of the tube support member 13" through frictional engagement of the tube support members by the belt 78 yet is positioned sufficiently close to the upper run of the belt 78 to exert a slight pressure through the tube support members 13" on the belt 78 to prevent twisting of the belt from a horizontal disposition upstream beyond the belt twist stop member.

As best seen in FIG. 11, the axis of the guide roller 80 is supported at an inclination such that the annular inclined ferromagnetic components 34" of each tube support member 13" arriving at the downstream end of the belt 78 is oriented in a generally vertical transfer orientation for engagement by a carrier member for vertical movement of the engaged tube support member 13". The lower horizontal transport component additionally includes a transfer support member 82 for supporting the exposed upper end of each supported tube 15 during tilting of the tube support member 13" supporting the respective tube at the downstream end of the belt 78. The transfer support member 82 includes a contoured rail for supporting the exposed tube ends during the increasing tilting of the tube as the respective tube support member 13" travels toward the downstream transfer location. Additionally, the horizontal transport component includes a second transfer support member 83 for laterally orienting the tube support members 13" at the downstream end of the belt 78 and for preventing further downstream travel of the tube support members beyond a downstream transfer location at which the tube support members are magnetically engaged by carrier members for vertical movement of the tube support members.

The carrier members for magnetically engaging the tube support members 13 during their vertical transport are uniformly spaced on a carrier member conveying means which can be in the form, for example, of a conventional flexible endless member or belt 84' trained around a lower guide roller 88 and an upper drive roller 89, which is operatively connected to a conventional drive motor (not shown) for driving operation of the belt 84'. Each carrier member includes magnetic means operable to magnetically interact with the ferromagnetic components of the tube support members 13" delivered by the lower horizontal transport component to the downstream transfer location for supporting the tube support members for conveyance thereof between the downstream transfer location and an upstream transfer location vertically spaced from the downstream transfer location. The carrier member magnetic means includes a first permanent magnet 85 forming an initial tube support member contact surface compatibly configured with the ferromagnetic component of the tube support members 13" for surface to surface contact therewith and a second permanent magnet 86 forming a generally planar, supplementary magnetic surface for surface to surface contact with the ferromagnetic components of the tube support members 13" at a circumferentially spaced location from the portion of the ferromagnetic component in surface to surface contact with the magnetic contact surface of the first permanent magnet 85. The first permanent magnet 85 and the second permanent magnet 86 are permanent in the sense that each is continuously magnetically active. The permanent magnets 85, 86 of each carrier member are spaced from one another along the endless extent of the belt 84' by a spacing corresponding to the diameter of a tube support member 13" with the spacing being generally the same as the non-magnetic space across the bottom of the tube support members between the inner extremities of the ferromagnetic components. The initial contact surface of the permanent magnets are spaced from the belt 84' and lie in common vertical planes during the upwardly moving and downwardly moving runs of the belt 84'. The initial contact surface of the first permanent magnet 85 preferably has an area at least twice as great as the area of the supplementary magnetic surface formed by the second permanent magnet 86. A pair of transfer guiding plates 87 are mounted to the frame of the textile machine and extend parallel to the common vertical plane in which the surfaces of the permanent magnets 85, 86 are disposed and offset laterally outwardly therefrom in a direction away from the belt 84' at a spacing from the common vertical plane generally corresponding to the axial extent of the annular base portion of a tube support member 13". The transfer guide plates 87 are spaced from one another by an amount sufficient to permit the passage therebetween of a tube 15 and/or a yarn package 14 supported on a tube support member 14" being transported by one of the carrier members. The guide plates 87 insure that the tube support members 13" are reliably mounted in stable surface to surface contact with the surfaces of the permanent magnets 85, 86 of each carrier member following the transfer of the respective tube support member 13' to the respective carrier member at the downstream transfer location. The vertical transport component 84 additionally includes a pair of arcuately shaped guide plates 90 disposed in the same vertical plane as the transfer guide plates 87 and mounted to the textile machine at a spacing from one another at the location at which the belt 84' is trained around the drive roller 89. The pair of guide plates 90 are spaced from one another by an amount sufficient to permit passage therebetween of a tube 15 and/or a yarn package 14 supported on a tube support member 13" being carried by a carrier member. The guide plates 90 insure that the tube support members 13" being carried by the carrier members remain stabily mounted on the permanent magnets 85, 86 of the carrier members as the carrier members travel along the semi-circular travel path at the top of the upwardly moving run of the belt 84'.

The vertical transport component 84 further includes an upper horizontal transport component for receiving tube support members 13" at the vertical upstream transfer location and transporting the tube support members along a horizontal transport path extending at a higher elevation than the horizontal path of the lower horizontal transport component. The upper horizontal transport component includes an endless member or belt assembly having a flexible endless belt 91 trained around a guide roller 92 and a conventional guide roller (not shown), which is operatively connected to a conventional drive motor (not shown) for driving operation of the belt 91. The upper horizontal transport component additionally includes means for inclining the lateral orientation of the belt 91 transversely to its endless extent from a horizontal orientation to an inclined orientation at the upstream transfer location for receiving inclined tube support members 13' transferred thereto from the carrier members.

The lateral orientation inclining means includes a pair of belt rollers 97, each positioned for supporting the bottom of a respective one of the upper and lower runs of the belt 91 at a common location downstream of the upstream transfer location, a belt twist block member 95 positioned at the location of the belt rollers 97 and mounting means (not shown) for mounting the guide roller 92 to the frame of the textile machine with the axis of the guide roller inclined relative to the horizontal. The belt twist stop member 95 is spaced from the upper run of the belt 91 by a spacing sufficient to permit passage therebetween of the annular base portion of a tube support member 13" yet sufficiently closely adjacent the belt 91 to apply a downward pressure through the annular base portion of the tube support member 13" passing therebetween to the belt 91, which is supported at the pressure receiving location by one of the belt rollers 97.

The upper horizontal transport component further includes a means for interrupting the magnetic interaction between the permanent magnets 85, 86 of each carrier member and the ferromagnetic component of a tube support member 13" supported on the respective carrier member at the upstream transfer location to effect release of the tube support member 13" from the respective carrier member onto the belt 91. The magnetic interrupting means includes a pair of tapered members 93 positioned on respective opposite lateral sides of the belt 84' and tapering outwardly therefrom. The tapered members 93 are laterally spaced from one another by an amount sufficient to permit passage therebetween of the carrier members and less than the extent of a tube support member 13". The tapered wedge members 93 are positioned intermediate the guide plates 90 and the upper run of the belt 91 at the vertical upstream transfer location adjacent to the top of the downward run of the belt 84'. Thus, the tapered members engage the passing tube support members and cause them to move outwardly from the respective supporting carrier members to interrupt the magnetic interaction and thereby effect release of the tube support members at an inclination for sliding onto the belt 91 of the upper horizontal transport component.

The upper horizontal transport component additionally includes an upper transfer support means having a contoured rail 94 mounted to the frame of the textile machine at the upstream transfer location and contoured for continuously supporting an exposed upper end of a tube 15 supported on a tube support member 13" being transferred onto the belt 91 during inclining of the tube in correspondence with the movement of the respective tube support member 13" from an inclined transfer orientation to a horizontal orientation. Additionally, a lateral guide rail 96 is mounted to the frame of the textile machine and extends along the upper run of the belt 91 at the upstream transfer location for laterally orienting tube support members 13" supported on the belt 91.

The contact initial tube support member surface of the first permanent magnet of an oncoming carrier member initially contacts the generally vertically oriented uppermost portion of the ferromagnetic component 34" and magnetically engages the ferromagnetic component to effect movement of the engaged tube support member 13" with a carrier member as the carrier member travels upwardly beyond the downstream transfer location along the upwardly moving run of the belt 84'. As the lowermost portion of the annular ferromagnetic component 34' of the engaged tube support member clears the belt 78, the tube support member pivots under its weight relative to the initial contact surface of the first permanent magnet 85 while remaining magnetically engaged therewith and the lowermost portion of the annular ferromagnetic component 34' swings into surface to surface contact with the supplementary magnetic surface of the second magnet 86. Immediately thereafter, the engaged tube support member 13", which is now magnetically engaged by both of the permanent magnets 85, 86 of the respective carrier member at circumferentially spaced locations, travels along the inner surfaces of the transfer guide plates 87, which apply a relatively slight pressure to the top surface of the annular base portion of the tube support member to insure that the tube support member is stabily magnetically engaged by the permanent magnets 85, 86.

The carrier members are spaced from one another relative to the endless extent of the belt 84' at a uniform spacing sufficient to insure that the tube support member 13" most recently engaged by a carrier member has been transferred sufficiently beyond the downstream transfer location to avoid interference with the next following tube support member 13" being loaded onto the next following carrier member at the downstream transfer location. The engaged tube support members 13" are transported along the guide plates 90 as the belt 84 travels in a semi-circular path from its upwardly moving run to its downwardly moving run and the guide plates 90 insure that the engaged tube support members 13" remain stabily magnetically engaged by the carrier members during this travel. As each engaged tube support member 13" travels beyond the guide plates 90, the respective carrier member passes between the tapered members 93 which engage the bottom surface of the engaged tube support member and move the tube support member progressively laterally outwardly out of magnetic engagement with the permanent magnets 85, 86 of the carrier member as the carrier member travels between the tapered members 93. As seen in FIG. 11, the now-disengaged tube support member is oriented at a transfer inclination by the tapered members 93 parallel to the inclination of the belt 91 of the upper horizontal transport run component at the upstream location. Accordingly, the tube support member slides along the tapered members 93 onto the upstream end of the belt 91 and its lowermost portion is engaged by the lateral orientation member 96 to laterally orient the tube support member as the belt 91 begins to transport the tube support member. The contoured rail 94 guides the exposed upper end of the tube supported on the tube support member as the tube support member moves during its change of orientation from the inclined transfer orientation to a horizontal orientation. The tube support member passes between a belt twist stop member 95 and the belt roller 97 while supported on the belt 91 and travels thereafter in a horizontal orientation on the belt 91 toward a further handling location.

The relatively large surface area of the initial contact surface of the first permanent magnet 85 of each carrier member insures that the tube support members 13" are reliably initially magnetically engaged by the carrier members. Although the first permanent magnet 85 of each carrier member is initially the only magnet of the carrier member which bears the load of the tube support member being transferred thereto, the contoured configuration of the contour rail 82 insures that the first permanent magnet 85 does not bear the entire weight of the engaged tube support member prior to the engagement of the tube support member by the second permanent magnet 86. The exposed upper end of the tube 15 on the engaged tube support member 13" remains in guided engagement with the contoured rail 82 until the annular base portion of the tube support member has swung into engagement with the supplementary magnetic surface of the second permanent magnet 86.

Figure 12:
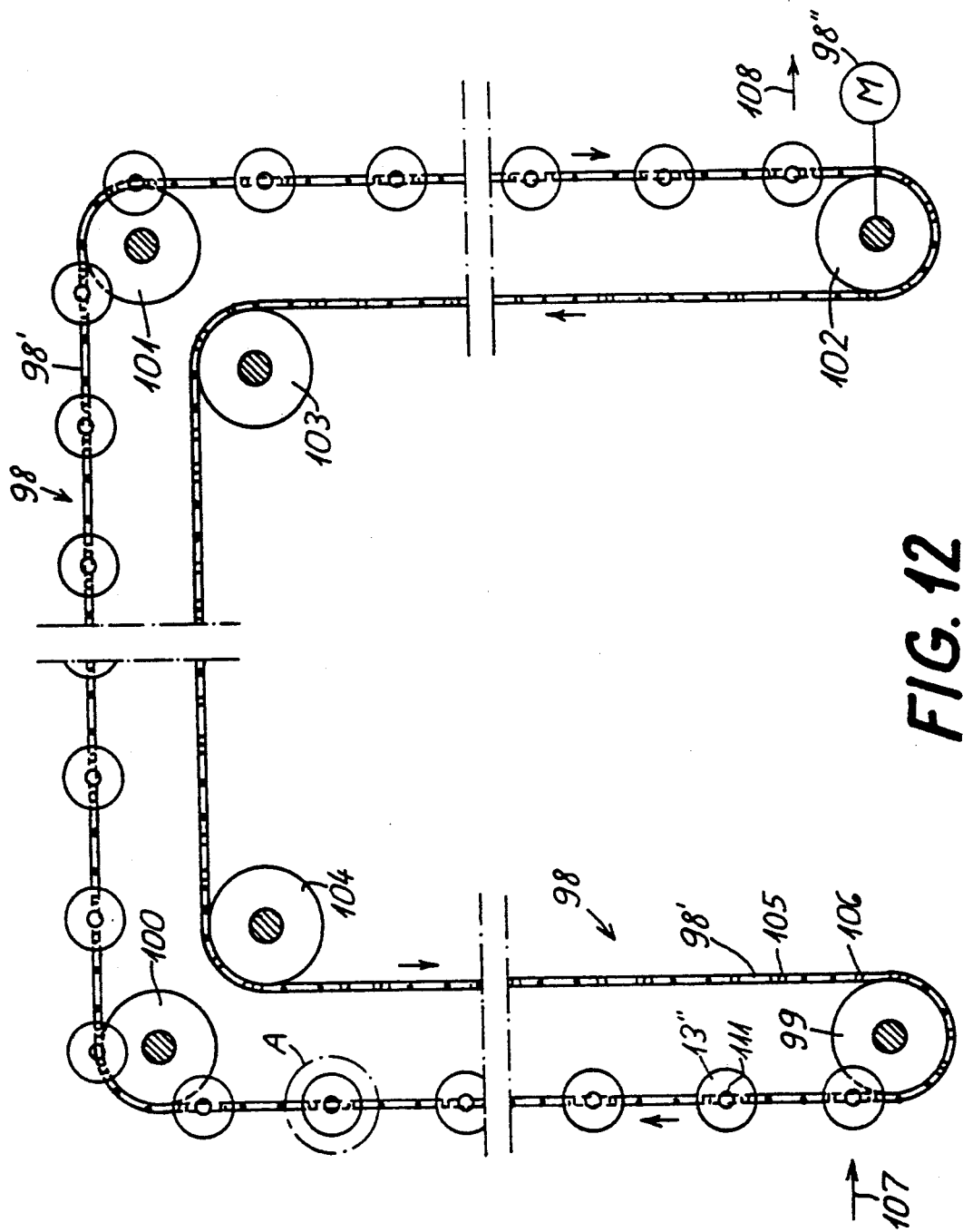
FIG. 12 is a front elevational view of another form of the vertical transport component shown in FIGS. 10 and 11.
Figure 13:
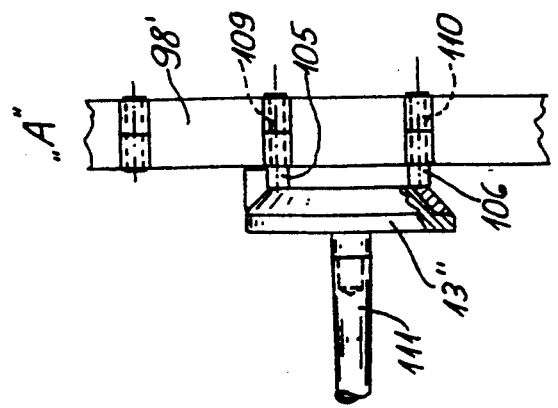
FIG. 13 is an enlarged side elevational view, in partial vertical section, of a portion of the vertical transport component shown in FIG. 12.

FIGS. 12 and 13 illustrate one modification of the tube transport assembly shown in FIGS. 10 and 11. A vertical transport component 98 includes a flexible endless member or belt 98' trained around a guide roller 99 at a downstream transfer location, a pair of delivery run guide rollers 100, 101, a drive roller 102 and a pair of return run rollers 103, 104. The drive roller 102 is operatively connected to a conventional drive motor 98" for driving operation of the belt 98'. The vertical transport component 98 includes a plurality of carrier members secured to the belt 98' at uniform spacings therealong and each including a pair of permanent magnets 105, 106 which operate similarly to the permanent magnets 85, 86 of the carrier members described with respect to FIGS. 10 and 11 for magnetically engaging tube support members for transport by the vertical transport component 98. A delivery horizontal transport component identical in structure and operation to the lower horizontal transport component shown in FIGS. 10 and 11, transports tube support members in a delivery direction indicated by an arrow 107 to a downstream transfer location for engagement of the tube support members by the carrier members mounted on the belt 98'. A discharge transport component, identical in structure and operation to the upper horizontal transport component shown in FIGS. 10 and 11, receives tube support members from the carrier members at an upstream transfer location and transports these tube support members in a discharge direction indicated by an arrow 108 to a further handling location. The delivery path of the belt 98' along which the tube support members 13" are carried by the carrier members initially extends vertically from the downstream transfer location, then along a generally horizontal extent between the delivery run guide rollers 100, 101, and therefrom it extends vertically downwardly to the upstream transfer location. The belt 98' follows the return path which extends initially vertically upwardly from the upstream transfer location, along a generally horizontal extent between the return run guide rollers 103, 104 and along a vertically downwardly moving extent to the downstream transfer location. The vertical transport component 98 therefore defines a passageway for service personnel or service devices to pass thereunder.

As seen in FIG. 13, the permanent magnets 105, 106 of each carrier member engage the inclined annular ferromagnetic component of each tube support member 13" at diametrically opposed circumferential locations thereon. The permanent magnets 105, 106 are each secured to the belt 98' by a threaded bolt 109, 110, respectively. The tube support members 13" can be configured to transport various types of tubes such as, for example, a tube 111 of reduced diameter relative to the standard yarn package tubes 15.

Another version of the tube transport assembly which includes a vertical transport component 118 is illustrated in FIGS. 14 and 15. The tube support members, which are of the type of tube support members 13" illustrated in FIG. 9 having annular inclined ferromagnetic components 34", are horizontally transported by a lower horizontal transport component having the same arrangement and operation of a belt 112, guide roller 117, drive roller, inclining guide rollers 113, belt twist stop member 114, transfer support member 115, and second transfer support rail 116 as described above in relation to the embodiment illustrated in FIGS. 10 and 11.

The vertical transport component 118 transports carrier members for engaging and carrying tube support members between vertically spaced locations. This vertical transport component has the same arrangement and operation of a belt 118', lower guide roller 123, and upper drive roller as described above in relation to the embodiment illustrated in FIGS. 10 and 11.

An upper transport component extends from the vertical transport component to receive and transport therefrom the support members. This upper transport component has the same arrangement and operation of a belt 126, guide roller, a drive roller, a pair of inclining belt rollers 127, a belt twist block member 130, a pair of tapered members 125, contoured rail 129, lateral guide rail 128 as described above in relation to the embodiment illustrated in FIGS. 10 and 11.

As seen in FIG. 15, each of the carrier members 119 includes a magnet 120 forming an initial tube support member engaging surface 120' and a generally planar, supplementary magnetic surface 120''. Additionally, each carrier member 119 includes a pair of generally planar, supplementary magnetic surfaces 121 disposed in the same plane as the supplementary magnetic surface 120''. The magnetic surfaces of each carrier member 119 are supported by a bracket which is fixedly connected by conventional securement means such as, for example, a nut and bolt assembly, to the belt 118'.

The three supplementary magnetic surfaces of each carrier member 119, which includes the surface 120'' and the pair of surfaces 121, are supported by the bracket 119 in positions for surface to surface contact with the annular ferromagnetic component 34'' of a tube support member 13'' at circumferentially spaced locations thereon. The supplementary magnetic surface 120'' is supported by the bracket relative to the belt 118' such that the magnetic surface is aligned with the endless extent of the belt 118' in its upwardly moving run in which it initially engages the tube support members 13''.

The initial tube support member engaging surface 120' is supported by the bracket of the respective carrier member 119 in alignment with the endless extent of the belt 118' in its upwardly moving run. Additionally, the initial engaging surface 120' is arcuately concavely shaped in a direction transverse to the lateral and endless extents of the belt 118 and is arcuately shaped in a direction transverse to the endless extent of the belt 118'. The arcuate shape of the initial engaging surface 120' is compatibly configured with the vertically uppermost portion of the annular ferromagnetic component 34'' of a tube support member 13'' supported at the downstream transfer location at the inclined transfer orientation. In this transfer orientation, the portion of the annular ferromagnetic component 34'' lying on a radius of the annular base portion of the respective tube support member 13'' which extends parallel to the extent of the upwardly moving run of the belt 118 is directly vertical and is engaged by the portion of the initial engaging surface 120' lying on the radial midpoint of the contact magnetic surface. The initial engaging surface 120' is disposed outwardly from the common plane in which the supplementary magnetic surfaces 121, 120'' are disposed in a direction transverse to the lateral and endless extents of the belt 118'.

The carrier members 119 operate as follows to magnetically engage the tube support members 13'' supported at the downstream transfer location. As each carrier member 119 is moved upwardly by the belt 118 during travel of the belt between the guide roller 123 and the downstream transfer location, the initial engaging surface 120' of the carrier member is the vertically uppermost portion of the carrier member. The initial engaging surface 120' is moved by the belt 118' adjacent the annular ferromagnetic component 34'' of the tube support member at the downstream transfer location, which is supported by the belt 112 at an inclination such that the vertically uppermost portion of the annular ferromagnetic component 34'' is vertically disposed parallel to the belt 118' along its upwardly moving run.

The initial engaging surface 120' magnetically engages the vertically uppermost portion of the annular ferromagnetic component 34'' to cause sliding of the tube support member at the downstream transfer location laterally along the belt 112 as the carrier member 119 continues to move upwardly. When the vertically lowermost portion of the annular base portion of the tube support member has cleared the belt 112, the tube support member, which is still magnetically engaged by the initial engaging surface 120', pivots by its weight relative to the initial engaging surface to bring the bottom annular surface of the ferromagnetic component 34'' into surface to surface contact with the supplementary magnetic surfaces 121, 120''. The gravitationally induced pivoting of the tube support member relative to the initial engaging surface 120' is sufficient to interrupt the magnetic interaction between the annular ferromagnetic component 34'' and the initial engaging surface 120' so that the annular ferromagnetic component 34''', once its annular bottom surface has moved into surface to surface magnetic contact with the supplementary magnetic surfaces 121, 120'', it is no longer in surface to surface contact with the initial engaging surface 120'.

The engaged tube support member 13'' is thereafter supported in a vertical disposition by the supplementary magnetic surfaces 121, 120'' of the respective carrier member 119 with the respective yarn package 14 supported by the tube support member extending generally horizontally therefrom.

FIGS. 16-18 illustrate a modification of the magnetic arrangement of the present invention. In this modification a plurality of individual carrier members 131 are disposed at uniform spacings along an endless belt for individually supporting the tube support members 13'' on the belt 134 for transport thereby. As best seen in FIG. 17, each individual carrier member 131 includes four radially extending arm members radially extending from a common mounting bracket 135 and spaced 90° apart. As seen in FIG. 16, the mounting bracket 135 is secured to the belt 134 by conventional securement means such as, for example, a pair of bolts 136 threadingly received in threaded holes formed in the belt 134. The four arm members of each individual carrier member 131 are oriented relative to the endless extent of the belt 134 such that the belt bisects the angle formed between the arm members of a leading pair of the arm members and between the arm members of a trailing pair. The outer free ends of the leading pair of arm members each support a magnetic component 132, 133, respectively. The outer free ends of the trailing pair of arm members each support a magnetic component 137, 138, respectively. Each magnetic component 132, 133 of the leading arm members includes a planar horizontal surface 132'', 133'', respectively, and an inclined, arcuately shaped magnetic surface 132', 133', respectively. Each of the arcuately shaped magnetic surfaces 132', 133' are compatibly configured with the curvature of the inclined surface portion of the annular ferromagnetic component 34'' of a tube support member 13'' for surface to surface magnetic engagement therewith. Additionally, the planar horizontal magnetic surfaces 132'', 133'' are supported by their respective arm members for engaging the bottom circumferential portion of the annular ferromagnetic component 34'' at respective circumferentially spaced locations thereon.

Each of the magnetic components 137, 138 of the trailing arm members include a planar horizontal surface disposed in positions for engaging the bottom circumferential surface of the annular ferromagnetic component 34" at respective circumferentially spaced locations thereon.

FIG. 18 illustrates a possible configuration of each of the magnetic components 137, 138 in which the magnetic component includes a first half portion 139 and a second half portion 140, each half portion being of opposite magnetic polarity.

In operation, the tube support members 13" are disposed by conventional transfer means (not shown) onto the individual carrier members 131 in a manner in which the inclined portion of the annular ferromagnetic component 34" of the tube support member is disposed in surface to surface contact with the curved magnetic surfaces 132', 133'. This surface to surface magnetic contact necessarily insures that the bottom circumferential surface of the annular ferromagnetic component 34" is also in surface to surface magnetic contact with the respective horizontal surfaces of the magnetic components 132, 133, 137 and 138. Each tube support member 13" is therefore securely magnetically engaged by the respective individual carrier member 131 on which it is disposed for reliable transport by the belt 134. The opposite magnetic polarity configuration of the magnetic components illustrated in FIG. 18 advantageously strengthens the magnetic interaction between the magnetic component and the annular ferromagnetic component 34" of the tube support member since the path of magnetic alignment extends from one of the half portions 139,140 through the annular ferromagnetic component to the other half portions 139, 140.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An assembly for transporting tubes in association with a textile machine, the tubes being of the type on which yarn is wound, comprising:
 a plurality of tube support members for supporting tubes for transport along a predetermined travel path, said tube support members individually including a common selected one of a magnetic means and a ferromagnetic component; and
 means for selectively diverting tube support members from said predetermined travel path, said selectively diverting means including the other of said magnetic means and said ferromagnetic component, said magnetic means and said ferromagnetic component magnetically interacting with one another, sensing means for sensing a characteristic of a tube support member or a tube supported on a tube support member and means for selectively varying the magnetic interaction between said magnetic means and said ferromagnetic component to selectively divert tube support members from said predetermined travel path in response to the sensing by said sensing means of the presence or absence of said characteristic of the respective tube support members to be diverted.

2. The assembly according to claim 1 and characterized further in that said tube support members include said ferromagnetic component and said means for selectively diverting tube support members includes said magnetic means.

3. The assembly according to claim 2 and characterized further in that said magnetic means includes an electromagnet configured to be magnetically activated in correspondence with the flow of electricity thereto.

4. The assembly according to claim 2 and characterized further in that said magnetic means includes a plurality of electromagnets disposed relative to at least a selected portion of said predetermined travel path for magnetic interaction with said ferromagnetic components of said tube support members to guide said tube support members along said selected portion of said predetermined travel path and means for controlling the magnetic activation of said electromagnets to sequentially magnetically activate said electromagnets in the direction of advancement of said tube support members along said selected portion of said predetermined travel path to effect sequential individual magnetic interaction of said electromagnets with said ferromagnetic components of said tube support members.

5. The assembly according to claim 4 and characterized further in that said electromagnets are disposed on a common lateral side of said predetermined travel path, said tube support members have annular peripheries adjacent said electromagnets with said ferromagnetic components disposed around said peripheries, and said control means cyclically activates said electromagnets to effect translational rotation of said tube support members along said selected portion of said predetermined travel path.

6. The assembly according to claim 2 and characterized further by guiding means including an endless member assembly having an endless member and means for driving said endless member, said endless member fictionally engaging said tube support members to advance said tube support members along said predetermined travel path in correspondence with the driving operation of said endless member and said means for selectively diverting tube support members operates said magnetic means to magnetically interact with said ferromagnetic components of said tube support members to oppose said frictional engagement of said tube support members by said endless member.

7. The assembly according to claim 2 and characterized further in that said predetermined travel path includes at least one junction from which said predetermined travel path extends in at least two different directions and said means for selectively diverting tube support members is selectively operable to operate said magnetic means for guiding of said tube support members along a selected one of said directions of said predetermined travel path extending from said junction.

8. The assembly according to claim 6 and characterized further in that said magnetic means includes a pair of magnets, each said magnet being selectively operable to magnetically interact with said ferromagnetic components of said tube support members at a location along said predetermined travel path spaced from the location along said predetermined travel path at which the other said magnet magnetically interacts with said tube support members.

9. The assembly according to claim 8 and characterized further in that said tube support members have annular peripheries with said ferromagnetic components disposed around said peripheries and said magnets are spaced from one another relative to said predetermined travel path by at least the diameter of the annular periphery of a tube support member.

10. The assembly according to claim 6 and characterized further in that said tube support members have annular peripheries with said ferromagnetic components disposed around said peripheries, said magnetic means includes a first magnet selectively operable to magnetically interact with said ferromagnetic components of said tube support members and said guiding means includes a cooperating member spaced from said first magnet at a spacing less than the diameter of the annular periphery of a tube support member, said first magnet and said cooperating member cooperating to engage a tube support member at circumferentially spaced locations thereon to respectively retain said engaged tube support member at a predetermined location along said predetermined travel path.

11. The assembly according to claim 10 and characterized further in that said first magnet is annularly shaped.

12. The assembly according to claim 11 and characterized further in that said cooperating member is a second magnet, said second magnet being annularly shaped.

13. The assembly according to claim 12 and characterized further in that said predetermined travel path includes a junction from which said predetermined travel path branches in at least two different directions and said second magnet is selectively magnetically activatable at a position adjacent said junction for guiding of tube support members through said junction onto a selected branch of said predetermined travel path through translational rotation of said tube support members about the circumference of said second magnet.

14. The assembly according to claim 12 and characterized further in that said guiding means includes means for sensing the presence of a tube support member at a predetermined sensing location relative to said predetermined retaining location, said sensing means being operatively connected to said means for selectively varying the magnetic interaction and said means for selectively varying the magnetic interaction operating said second magnet for magnetic interaction with the ferromagnetic component of a sensed tube support member in response to sensing by sensing means of the respective tube support member.

15. The assembly according to claim 14 and characterized further in that said means for selectively diverting tube support members selectively operates said first and second magnets out of magnetic interaction with the ferromagnetic component of a tube support member engaged by said magnets to permit guiding of said tube support member by said guiding means along a predetermined one of said predetermined travel path branches.

16. The assembly according to claim 14 and characterized further in that said means for selectively diverting tube support members operates said first magnetic out of magnetic interaction with the ferromagnetic component of a tube support member engaged by said first and second magnets are simultaneously operates said second magnet for magnetic interaction with the ferromagnetic component of said tube support member to effect guiding of said tube support member through said junction to a selected one of said predetermined travel path branches.

17. The assembly according to claim 16 and characterized further in that said means for selectively diverting tube support members operates said first magnetic for magnetic interaction with the ferromagnetic component of a tube support member which follows said tube support member in correspondence with the guiding of tube support member by said second magnetic to said selected one of said predetermined travel path branches to control the travel of tube support members along said travel path.

18. The assembly according to claim 12 and characterized further in that said first and second magnets have opposite magnetic polarity when they are operated by said means for selectively diverting tube support members for magnetic interaction with said ferromagnetic components of said tube support members.

19. The assembly according to claim 12 and characterized further in that said guiding means includes a sensor, operatively connected to said means for selectively diverting tube support members, for sensing a selected characteristic of a selected one of a tube support member retained at said predetermined retaining location, a tube supported on said retaining tube support member and a yarn package built on said tube, said means for selectively diverting tube support members selectively operating said first and second magnets in response to sensing by said sensor of said selected characteristic to selectively guide said retained tube support member to a selected one of said predetermined travel path branches in accordance with said sensed characteristic.

20. An assembly for transporting tubes in association with a textile machine, the tubes being of the type on which yarn is wound, comprising:

a plurality of tube support members for supporting tubes for transport along a predetermined travel path having a junction at which it branches in a plurality of branches in at least two different directions, each of said tube support member individually including a ferromagnetic component and being formed with an annular periphery adjacent its ferromagnetic component;

means for guiding said tube support members during the travel thereof along said predetermined travel path, said guiding means including an endless member assembly having an endless member and means for driving said endless member, said endless member frictionally engaging said tube support members to advance said tube support members along said predetermined travel path in correspondence with the driving operation of said endless member, magnetic means including an annularly shaped first magnet selectively operable to magnetically interact with said ferromagnetic components of said tube support members and a cooperating member spaced from said first magnet at a spacing less than the diameter of the annular periphery of a tube support member, the cooperating member being in the form of an annularly shaped second magnet, said first and second magnets cooperating together to engage a tube support member at circumferentially spaced locations thereon to respectively retain said engaged tube support member at a predetermined location along said predetermined travel path, and means for controlling the lateral orientation of said tube support members on said endless member transversely to the endless extent of said endless member, said lateral orientation controlling means being operable to laterally displace said tube support members partially laterally beyond a respective lateral side of said endless member at the said predetermined retaining location, said lateral orientation controlling means cooperating with said first and second magnets to laterally displace a tube support member partially laterally beyond said one respective lateral side of said endless member in position for magnetic interaction between the ferromagnetic component of said laterally displaced tube support member and said first and second magnets and said endless member acting to advance a tube support member from said predetermined retaining location in coordination with the operation of said first and second magnets to effect advancement of tube support members through said junction to a selected one of said predetermined travel path branches and said second magnet being selectively magnetically activatable at a position adjacent said junction for guiding of tube support members through said junction onto a selected branch of said predetermined travel path through translational rotation of said tube support members about the circumference of said annularly shaped second magnet; and means for selectively operating said magnetic means for magnetic interaction thereof with said tube support members to effect guiding of said tube support members and to magnetically interact with said ferromagnetic components of said tube support members to oppose said frictional engagement of said tube support members by said endless member.

21. The assembly according to claim 20 and characterized further in that said lateral orientation controlling means includes a component positioned downstream of said location at which said second magnet magnetically interacts with said ferromagnetic components of said tube support members relative to the direction of advancement of said tube support members along said predetermined travel path for guiding tube support members laterally inwardly relative to said endless member.

22. The assembly according to claim 1 and characterized further in that said sensing means is operable to sense the characteristic that a tube support member is a predetermined one of a sequence of tube support members sensed by said sensing means and said sensing means operates said means for selectively varying the magnetic interaction to divert said predetermined one tube support member.

23. The assembly according to claim 22 and characterized further in that said sensing means senses the characteristic that a tube support member is the last one of the sequence of tube support members consisting of a predetermined number of tube support members.

* * * * *